US011842246B2

(12) United States Patent
Abergel et al.

(10) Patent No.: US 11,842,246 B2
(45) Date of Patent: Dec. 12, 2023

(54) METHOD FOR DETECTING CHIPLESS RADIO FREQUENCY IDENTIFICATION DEVICES (RFID)

(71) Applicants: MGI DIGITAL TECHNOLOGY, Fresnes (FR); IDYLLIC TECHNOLOGY, Valence (FR)

(72) Inventors: Edmond Abergel, Paris (FR); Louis Gautier Le Boulch, Meudon (FR); Etienne Perret, Valence (FR)

(73) Assignees: MGI DIGITAL TECHNOLOGY, Fresnes (FR); IDYLLIC TECHNOLOGY, Valence (FR)

( * ) Notice: Subject to any disclaimer, the term of this patent is extended or adjusted under 35 U.S.C. 154(b) by 53 days.

(21) Appl. No.: 17/310,828

(22) PCT Filed: Mar. 11, 2020

(86) PCT No.: PCT/EP2020/056409
§ 371 (c)(1),
(2) Date: Aug. 25, 2021

(87) PCT Pub. No.: WO2020/182844
PCT Pub. Date: Sep. 17, 2020

(65) Prior Publication Data
US 2022/0050978 A1    Feb. 17, 2022

(30) Foreign Application Priority Data

Mar. 13, 2019  (EP) .................................... 19305301

(51) Int. Cl.
*G06K 7/10*    (2006.01)

(52) U.S. Cl.
CPC .............................. *G06K 7/10366* (2013.01)

(58) Field of Classification Search
CPC ................................................... G06K 7/10366
USPC ....................................................... 235/451
See application file for complete search history.

(56) References Cited

U.S. PATENT DOCUMENTS

| 2009/0278685 | A1 | 11/2009 | Potyrailo et al. |
| 2015/0199602 | A1* | 7/2015 | van der Weide .. G06K 7/10366 235/492 |
| 2018/0146082 | A1* | 5/2018 | Adel .................... H04W 4/021 |
| 2022/0159053 | A1* | 5/2022 | Farrar ................... G10L 19/00 |
| 2022/0300782 | A1* | 9/2022 | Chen ................ G06K 19/0772 |

OTHER PUBLICATIONS

Rubayet-E-Azim et al.: "Short Time Fourier Transform (STFT) for collision detection in chipless RFID systems", 2015 Internation Symposium On Antennas and Propagation (ISAP), the Institute of Electronics, Information and Comm, Nov. 9, 2015, pp. 1-4.
Arnaud Vena et al.: "A Depolarizing Chipless RFID Tag for Robust Detection and its FCC Compliant UWB Reading System", IEEE Transactions On Microwave Theory and Techniques, Aug. 1, 2013, Plenum, USA, vol. 61, No. 8, pp. 2982-2994.

(Continued)

*Primary Examiner* — Ahshik Kim
(74) *Attorney, Agent, or Firm* — MASCHOFF BRENNAN

(57) ABSTRACT

This invention relates to a method for detecting chipless radio frequency identification devices (RFID), in particular chip detection, also referred to as chipless RFID tags. This invention also relates to the devices and tags which may be used in the claimed method.

17 Claims, 15 Drawing Sheets

(56) References Cited

OTHER PUBLICATIONS

Balbin et al.: "Phase-Encoded Chipless RFID Transponder for Large-Scale Low-Cost Applications", IEEE Microwave and Wireless Components Letters, IEEE Service Center, New York, NY, US, vol. 19, No. 8, Aug. 1, 2009, pp. 509-511.
Ramos Angel et al.: "Temporal Separation Detection for Chipless Depolarizing Frequency-Coded RFID", IEEE Transactions On Microwave Theory and Techniques, Plenum, USA, vol. 64, No. 7, Jul. 7, 2016, pp. 2326-2337.
International Search Report and Written Opinion dated May 15, 2020, in related PCT Application No. PCT/EP2020/056409.

\* cited by examiner

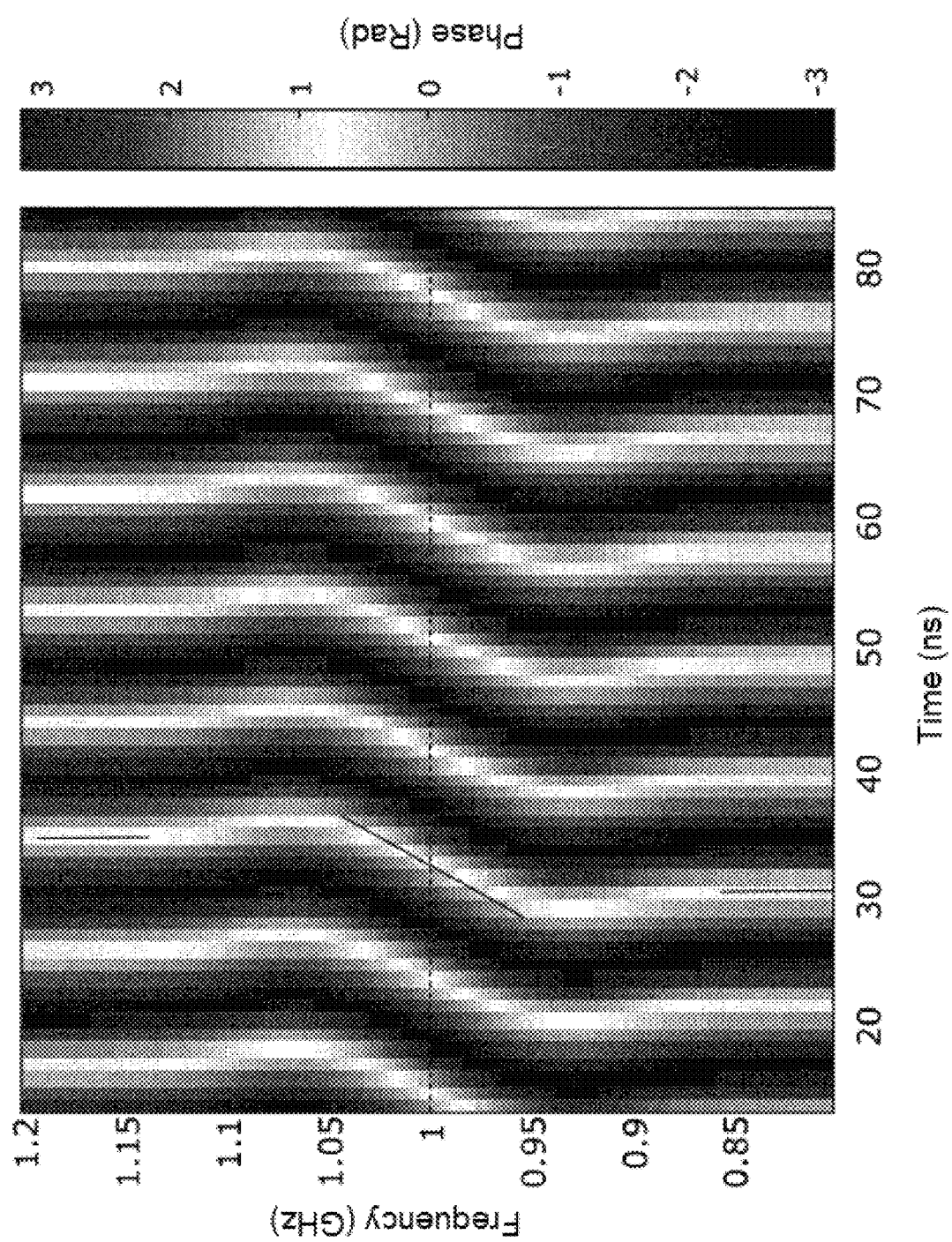
Fig. 4(cbis)

METHOD FOR DETECTING CHIPLESS RADIO FREQUENCY IDENTIFICATION DEVICES (RFID)

FIELD OF THE INVENTION

This invention relates to a method for detecting chipless radio frequency identification devices ("RFID") (customised), in particular, the detection of chipless RFID tags (customised), also known as "RF barcodes". Therefore, this invention also relates to devices and tags for use in the claimed method.

The device should be understood as packaging, a document, a tag, a security document, and possibly any support containing the marking that the chipless RFID may use for identification.

BACKGROUND

Data transmission systems using radio frequency identification technology are commonly used to identify all types of objects and living beings (e.g. an animal or human) carrying a suitable device (tag). Therefore, RFID technology has become increasingly popular in recent decades to store and transmit information.

This RFID technology uses a radio tag, also called a transponder (a contraction of the words "transmitter" and "responder"), which is placed on an object, and a reader, also called an interrogator, to read and identify the radio tag. RFID technologies are generally categorised as either "active" or "passive" tags. Active tags have a local power source (such as a battery) with which they send a signal to the reader, so they are usually characterised by a relatively long transmitted signal range. Passive tags, on the other hand, do not have an internal power source as the power to transmit their signal comes from the reader itself, and in particular from the reception of the signal emitted by the reader, so passive radio tags have a much shorter signal range, typically less than 8 metres.

RFID technology uses radio frequencies with much higher material penetration characteristics than optical signals from a practical standpoint. Thus, in comparison with barcode labels, RFID technology make its use in much more hostile environmental conditions possible; for example, RFID tags may be read through any type of material such as paper, cardboard, wood, paint, water, dirt, dust, animal or human bodies, concrete or even through the tagged item itself or its packaging. This has opened up a wide range of applications for RFID tags, including, by way of illustration, identification of goods and people, in particular packaging, cars (parking, tolls, etc.), inventory management, electronic access cards, without forgetting security documents such as for example a means of payment, such as a banknote, a check or a restaurant bill, an identity document, such as an ID card, a visa, a passport or a driving license, a lottery ticket, a transportation ticket or an entrance ticket to cultural or sporting events.

There are mainly two types of RFID tags: an integrated electronic circuit, so-called smart (electronic) tags, and tags that do not include an integrated electronic circuit, generally referred to in the art as "chipless RFID tags".

RFID chip tags (active or passive) usually include an antenna, an electronic circuit, a memory for storing an identification code. In particular, the electronic circuit makes it possible to receive the signal emitted by the read terminal and to emit in response, on a given frequency band, a modulated signal containing the identification code stored in the memory. For passive RFID tags, some of the power carried by the radio waves emitted by the read terminal is used to power the chip.

Because of the electronic circuitry in RFID chip tags, these tags have a significant cost. One of the reasons for proposing chipless tags was to reduce this cost. Therefore, this type of chipless RFID tag requires no integrated circuit or discrete electronic components, such as a transistor and/or coil and/or capacitor and/or antenna; it is their geometrically conductive characteristic that generates a specific behaviour, notably of the resonator type. This resonance characteristic at a given frequency enables chipless RFID tags to be printed directly onto a substrate at lower costs than traditional chip-based RF ID tags.

Other challenges also need to be addressed to make (customised) chipless RFID tags technology more reliable and, in particular, to improve the reliability and detection of tags in different environments. Indeed, there is no point in trying to increase the amount of information that a chipless tag may contain if its identification cannot be detected/read correctly in real environments and without having to use complex calibration techniques to extract the tag identifier. This detection challenge is further exacerbated when dealing with chipless radio frequency identification devices (customised) without a ground plane, as explained below in the description.

The majority of detection techniques used to date for chipless RFID tags require multiple measurements, namely measurement of the tag in its environment (e.g. on its substrate) as well as a measurement (without the tag) of the said environment (e.g. the substrate on which it is located). After that, the tag identifier is obtained by taking the difference between the measurement of the environment alone and the measurement with the tag. This is necessary because, in chipless RFID technology, the Radar Cross Section (RCS) of the tags is very small compared to the RCS of the environment. Despite this procedure, if an object has been added to the measurement environment of the tag without being initially present during the measurement of the environment (i.e. without the presence of the tag), the detection of the tag identifier may be impossible to obtain. This very limiting behaviour for chipless RFID technology also occurs when objects are mobile around the tag. Here again, measuring the environment alone does not allow the influence of the disturbing object to be taken into account correctly, as this influence is different during the measurement with the tag than without the tag (the backscattered field from the object which is measured by the reader and related to the position of the object in relation to the reader's antenna).

A novel technique to overcome these drawbacks has recently been developed. It consists of combining the use of robust depolarising tags with an approach to transforming the backscattered signal using a short-time Fourier transform (STFT) method; this allows the tag to be detected/identified without any calibration measurements. This is made possible because frequency domain depolarising chipless tags are inherently resonant structures designed to have a high-quality factor to have a high SER. This is why their quality factor is higher than that of the surrounding objects. Thus, the tags restore the power stored over a certain period of time (related to the resonator's quality factor (s) present on the tag); the power corresponding to the frequency of their resonances allows the tags to be identified. Discrimination based on this determination was described in the paper "Temporal Separation Detection for Chipless Depolarising Frequency-coded RFID" (Angle Ramos, Etienne Perret, Olivier Rance, Smail Tedjini, Antonio Lazaro, and David Girbau; IEEE Transactions on microwave theory and techniques, vol. 64, No. 7, July 2016, page—2326-2337). While the "Ramos" backscatter technique already constitutes a breakthrough in the field of chipless tags and of their identification, improvements are still being sought to overcome detection errors due to environmental background noise, from the presence of a moving object shifting around the tag while maximising the usable information by detecting/identifying the tag.

The article of Rubayet-E-Azim, N. Karmakar, E. Amin, "Short Time Fourier Transform (STFT) for collision detection in chipless RFID Systems", 2015 International Symposium on Antennas and Propagation (ISAP), pp. 1-4, November 2015, titled in French "Transformation de Fourier à court terme (STFT) pour la detection de collision dans les systèmes RFID sans puce" concerns a methodology for collision detection in a chipless RFID system. The teaching of this article consists of using several readers (in particular 3 as shown in FIG. 3 of the article) to query different tags at the same time and to keep only the signal from the reader with the best "SNR" (signal to noise ratio) in order to be able to differentiate the signals from each of the tags. It is, therefore, not a method of tag analysis and discrimination as in this invention, but rather an STFT-based methodology for differentiating multiple tags when they are in the reading area of the reader. As an example, in FIG. 2 of the article, which schematically presents the principle of the approach introduced based on a spectrogram (STFT); the tags (comprising N resonances, precisely 4 (Tag 2) and 3 (Tag 1)) are represented by N points (circle or star markers) and not the much more complex 2D shapes on which this invention is based. The idea is to show that with several readers, two tags may be read by at least one reader as long as they are not located at the same distance from the reader. Thus, the signal backscattered by each tag arrives at the reader at different times (noted t2 for tag 2 and t4 for tag 1), which allows them to be differentiated. If they were located at the same distance, the article explains that the reader would retrieve a signal at each moment, which would be the sum of the contribution of each tag and would therefore not be able to deduce which tags are in the reading zone. This is where STFT is used to separate the two signals from each tag temporally. Those skilled in the art understand that the authors assume throughout the article that the tags they are considering respond with a signal over a very short time, which is negligible compared to the other times in question (notably the round trip time of Fonde, which is described by t2 for example). This is why a tag's signal is represented by a dot in FIG. 2 of the article. A resonant tag considered in this invention cannot be represented in this way. Indeed, a line/segment type shape (segment spreading over the time axis) would be more appropriate, more representative in first approximation than a point that describes the behaviour of resonant tags very badly (improperly). The length of the segment would correspond to the time during which the tag continues to re-emit the signal in space and therefore in the direction of the reader. This time is characterised by the quality factor that indicates a resonator's ability to store power from the reader and re-emit it over time. Thus, in making this approximation, the authors do not consider this factor or simply assume that it is zero. This is very different from the approach described in this invention, where the tag quality factor is a very important element used to identify the tag identifier accurately.

The same applies to the very simplified representation of the tag's behaviour as a function of frequency. Here again, the evolution of the backscattered amplitude of a resonant tag as a function of frequency, it is improperly represented by a dot. A bell curve variation with a non-zero half-value width would more realistically represent the frequency behaviour of a tag in a spectrogram.

It is noted that in the paper, no information is given on how the resonant frequencies are extracted from the spectrogram. It is also noted that no analytical model is used to help interpret the spectrogram calculated based on the tag response. It is also noted that no spectrogram is calculated based on the response of a single tag. Finally, we note that no information is given on the signal's phase backscattered by the tag. The phase of the backscattered signal is not taken into account in the study.

FIGURES

Brief Description of the Figures

FIG. 4cbis shows the spectrogram phase of the transfer function $H(\omega)$ defined by equation (1), with f0=1 GHz and Q=15

DETAILED DESCRIPTION OF EXAMPLE EMBODIMENTS

Figure 1:
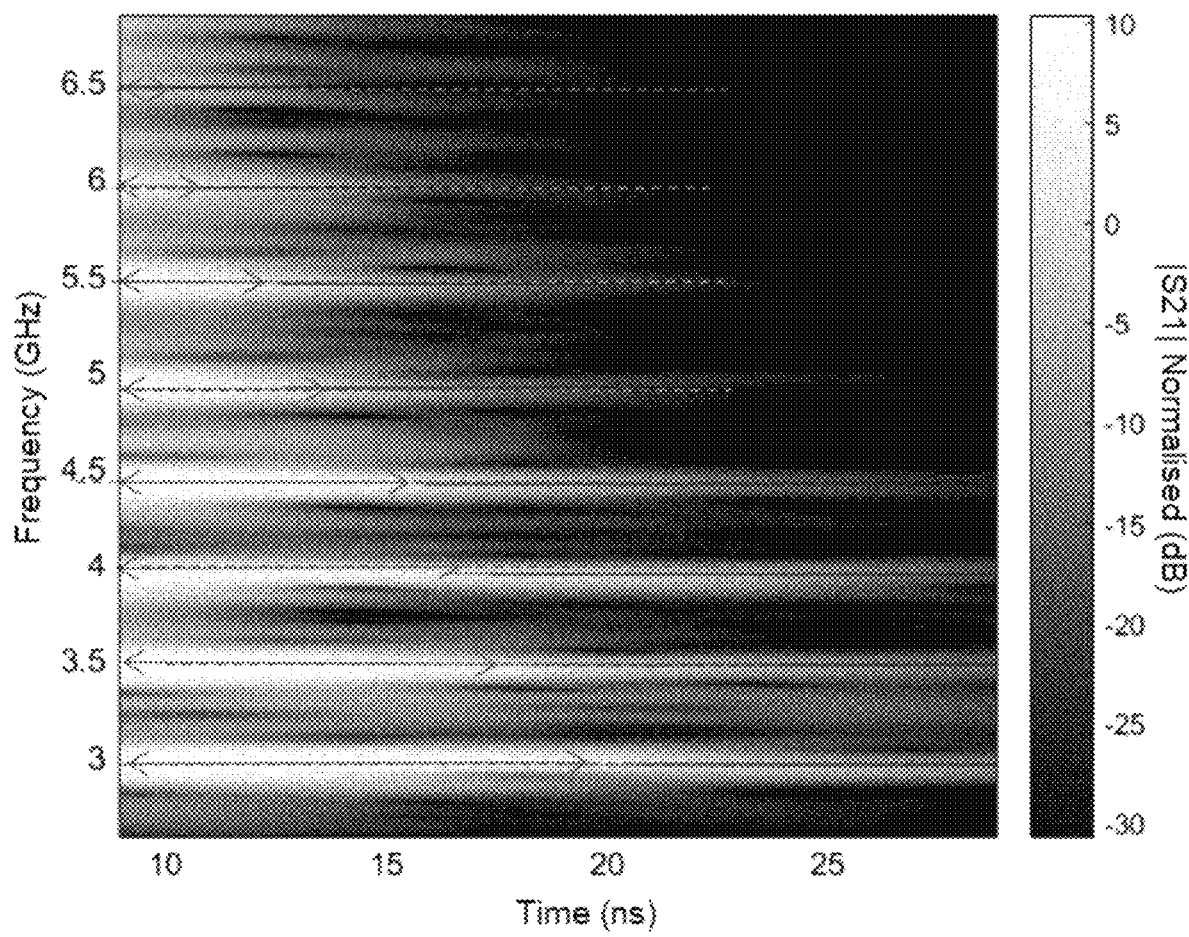
FIG. 1 shows a spectrogram of a response from a tag with 8 resonators

Thus, this invention provides a promising solution to this problem by proposing a method for detecting chipless radio frequency identification ("RFID") devices (customised), in particular, the detection of chipless RFID tags (customised); this has also led to the development of a new range of chipless (customised) radio frequency identification ("RFID") devices (customised) and tags for use in the claimed method, said devices/tags having physical properties particularly suited to the claimed detection mode.

In particular, this invention relates to a method of detecting a chipless radio frequency identification tag (RFID tag) (customised) characterised in that the detection method comprises communication between a reader and the tag on an ultra-wide frequency band (UWB) characterised by a bandwidth greater than or equal to 500 MHz, preferably between 3.1 and 10.6 GHz, the communication comprising the transmission of a signal from the reader to the tag and the backscattering of a signal from the tag, and identification of the tag by extraction of the backscattered signal using a time-frequency transformation [preferably a short-time Fourier transform (STFT)] comprising the establishment of a time-frequency spectrogram [preferably STFT], said identification being characterised in that it comprises the recognition of 2D shapes present on the time-frequency spectrogram, said shapes being the expression of the resonances from the RFID tag resonators.

This recognition of the 2D shapes present on the time-frequency spectrogram makes it possible to dispense with the averaging step of the time-frequency spectrogram [preferably STFT] of the prior art. Thus, this invention is also characterised in one preferred embodiment by the fact that the identification does not comprise a time-frequency spectrogram averaging step. In the context of this invention, the use of the qualifier "customised" for the device/tag merely confirms that the claimed method does allow identification/discrimination of the device/tag.

As explained in the following description, this invention has also led to the development of new tag families and new methods of identifying these families.

In one particular and preferred embodiment according to this invention, the customised chipless RFID tag suitable for use in the claimed detection method and/or use has the following characteristics A conductive pattern or a set of conductive patterns characterising its geometry, preferably with at least one or more or all asymmetric patterns, Characterised by its identifier, which includes at least one resonant frequency fri and preferably at least one quality factor Qi, Resonating on an ultra-wide frequency band (UWB) characterised by a bandwidth greater than or equal to 500 MHz, preferably between 3.1 and 10.6 GHz, Preferably without a ground plane, and Polarising or preferably depolarising.

In one particular embodiment, this invention also relates to the use of the claimed tags in a method of tag identification and discrimination which takes into account the resonant frequency and/or quality factor of said tags. Thus, this invention also relates to the use of customised chipless RFID tags in a detection method characterised in that the method allows the discrimination of two successive tags by means of the resonance frequency and/or the quality factor of said tags, preferably by means of their resonance frequency fri and quality factor Qi. The applicant has succeeded in developing a detection technology that makes it possible to dispense with the averaging of the time-frequency spectrogram. This is all the more unexpected when reading the prior art that considers this step to be an essential part of any tag detection process. Indeed, the processing based on the averaging of the spectrogram has the undeniable advantage of being able to carry out a frequency windowing (choice of the frequency band for the spectrogram calculation) then a temporal windowing when reading the spectrogram. These frequency windowings and, above all, the temporal windowings make it possible to isolate the tag's backscattered signal from the environment and thus to trace its identifier ("ID") and, more, in particular, its resonance frequency(ies). Averaging the spectrogram as described in Ramos' article above is equivalent to transforming a two-dimensional signal, that of the STFT spectrogram, into a one-dimensional (1D) signal, which has the advantage of being very easy to use afterwards (the ID of the tag is traced back to the maximums of the curve on this 1D signal). Similarly, this process has the major disadvantage of losing much of the available information on the original spectrogram (2D data) before the averaging operation. Indeed, we lose, for example, the 2D geometric shapes that were present and corresponded to the signal present on the tag. According to this invention, a discriminating advance in the reading of a chipless tag is extracting the tag ID directly from the 2D spectrogram signal. Indeed, this claimed method shows that it is possible to drastically reduce the false positive rate, i.e., detecting an ID that does not correspond to that of the tag read. This error is linked to a low signal-to-noise ratio or to the presence of a moving object around the tag, which in the case of averaging leads to the appearance of peaks at frequencies that are different from the resonance frequencies of the tag. It is shown that 2D processing of the spectrogram can eliminate these errors either by detecting the correct ID or if the signal-to-noise ratio is really too low, by recognising this reading as not usable and therefore not translating it into a false ID. A simple way to understand this is to recognise that a highly noisy signal will, after the averaging stage, lead to the presence of a very large number of peaks, and therefore the presence of peaks in the search frequency bands for code assignment. As these peaks are not related to the geometry of the tag, the extracted code is erroneous. However, the spectrogram reading is totally different and much less misleading as the noise is clearly differentiated from the signal linked to the tag resonance, as explained in detail below. This is because a tag-related resonance has a very recognisable 2D shape, as shown in FIG. 1; this FIG. 1, which represents a spectrogram of a tag response with 8 resonators, is explained in detail below.

In one particular embodiment, this invention relates to a method of detecting a customised chipless radio frequency identification tag (RFID tag) characterised in that the detection method comprises communication between a reader and the tag on an ultra-wide frequency band characterised by a bandwidth greater than or equal to 500 MHz, preferably between 3.1 and 10.6 GHz, the communication comprising the transmission of a signal from the reader to the tag and the backscattering of a signal from the tag, and identification of the tag by extraction of the backscattered signal using a time-frequency transformation including the establishment of a time-frequency spectrogram and the determination of at least one resonance frequency and, preferably at least one quality factor corresponding to this frequency, of the tag from the said time-frequency spectrogram, this determination being possible thanks to the recognition of the 2D shapes present on the time-frequency spectrogram, said shapes being the expression of the resonances from the RFID tag resonators; and preferably without having to perform a time-frequency spectrogram averaging step.

Any time-frequency transformation that allows the establishment of a corresponding spectrogram may advantageously be used in the context of this invention. By way of illustration, the STFT "short-time Fourier transform", Gabor decomposition, and/or wavelet transforms is cited.

Figure 2:
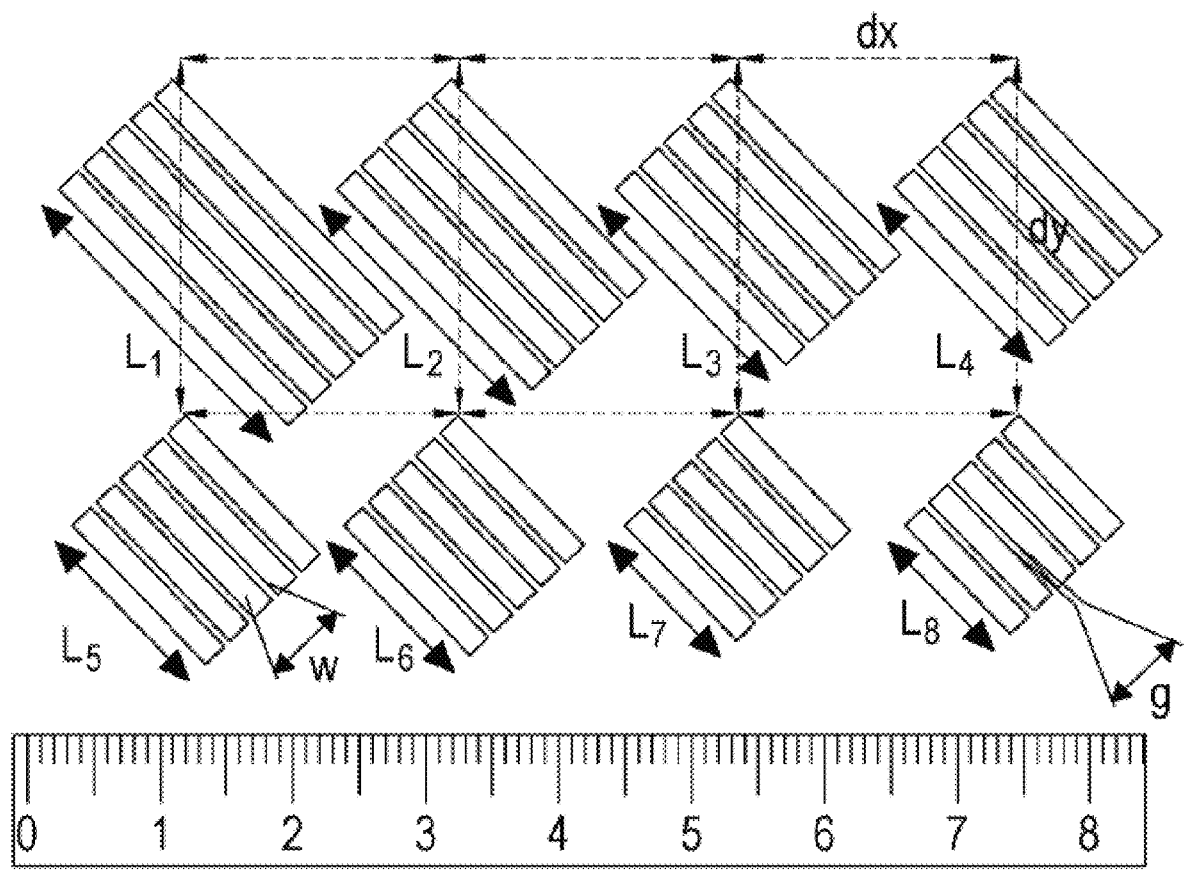
FIG. 2 shows the representative tag from the spectrogram in FIG. 1

By way of illustration, an example of an STFT spectrogram (2D representation) extracted from the backscatter response (measurement) of a chipless tag in connection with this invention is shown in FIG. 1. The tag used is shown in FIG. 2, where you can see a tag characterised by a geometry of 8 similar patterns (symmetrical in this example). The measurement was made in an anechoic chamber. FIG. 1 shows horizontal bands of different durations (which may be determined precisely by referencing the x-axis marked Time in ns on the Figure). Each band is characteristic of a tag resonance and, therefore, one of the 8 resonators present on the tag. Consequently, the tag contains 8 resonant frequencies (8 horizontal bands, which physically correspond to the presence of 8 resonant patterns corresponding respectively to each of the 8 patterns as seen in FIG. 2), which may be clearly seen in FIG. 1. The position along the y-axis (Frequency (in GHz)) of these bands determines the resonance frequency of each resonator. The subject-matter of this invention is a method for accurately determining these resonance frequencies, especially when the measurement is carried out in a very noisy environment. Upon reading FIG. 1, it may be seen that these frequencies correspond—in relation to the colour reference bar ("colourbar" more or less greyed out)—to the part where the signal is maximum in amplitude, i.e. in FIG. 1, the white areas which become grey and then black as the signal attenuates. It should be noted that a horizontal dotted line has been added to the spectrogram to clearly show the frequency that may be extracted by implementing this invention.

The duration (indicated by the x-axis) of these same parts (indicated by the arrows in FIG. 1) is also a very important parameter for reading a chipless tag in connection with a particular mode of execution according to this invention (frequency coding and quality factor). Therefore, we attempt to extract this information by using said spectrogram to extract quality factor values (second quantity intrinsic to the resonators). For example, in the case of the read tag [tag containing 8 identical resonators with simply a decrease in band length (noted $L_i$—with i=1 to 8—in FIG. 2)], these characteristic durations are indicated in FIG. 1 by arrows. Consequently, in this particular model, the invention concerns the introduction of a reliable method to detect both the tag resonance frequencies as well as the associated quality factor by using the spectrogram (time/frequency-2D representation of the results)—and one is able to do this without having to perform an averaging step for the STFT spectrogram.

Figure 3:
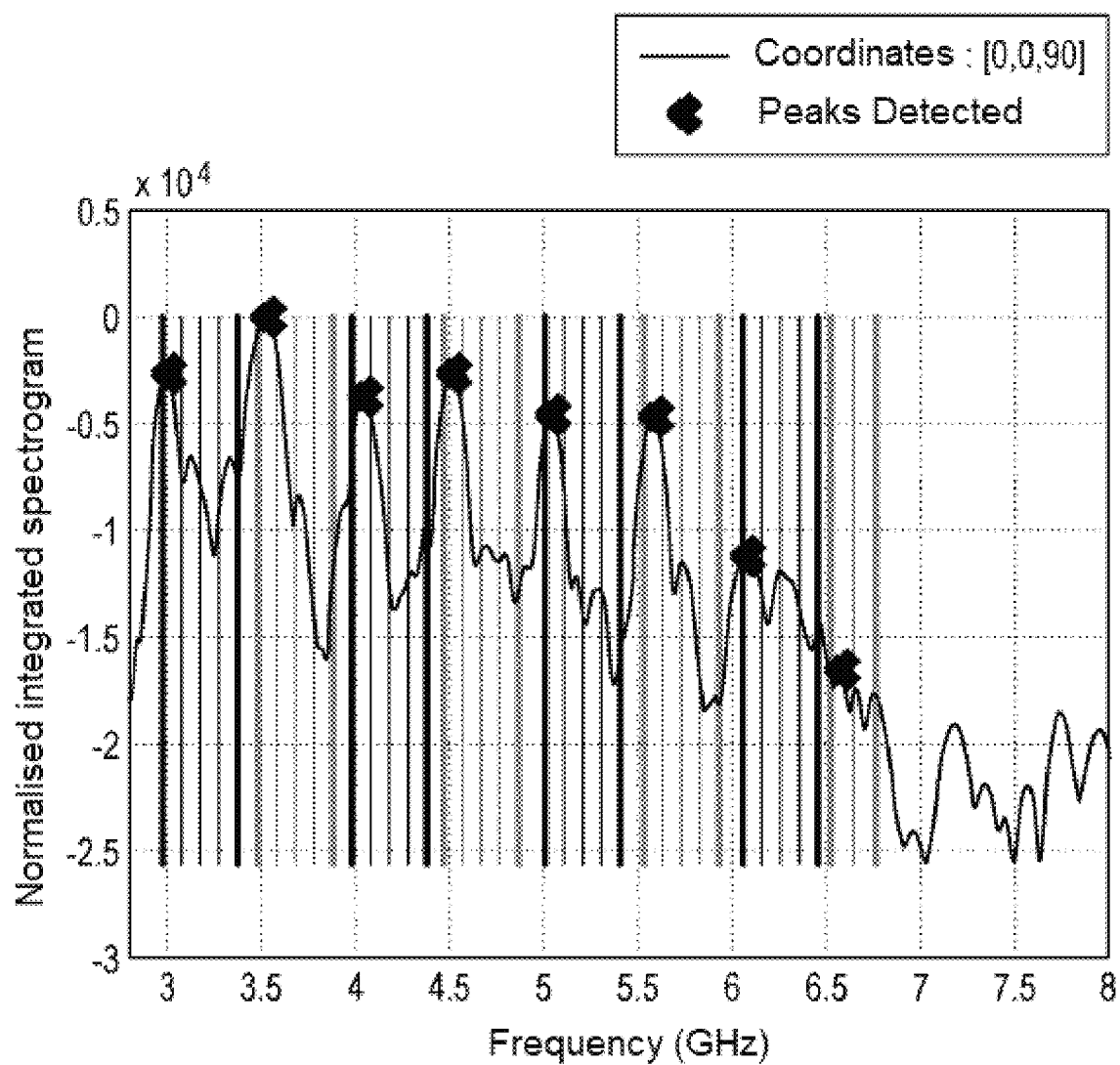
FIG. 3 shows a spectrogram averaged along the time axis (Ramos)

In the above-mentioned article by Ramos, one can find an approach to extract the resonance frequency of tags. The method consists of calculating the spectrogram as shown in FIG. 1; then defining a rectangular area (between times $\tau 1$ $\tau 2$ and frequencies F1 F2, where the definition of these 4 parameters is indicated in the aforementioned article by Ramos) upon which an operation is performed to switch back from a 2D datum (spectrogram) to a 1D datum (distribution of the signal as a function of the frequency). Indeed, the method consists of averaging along the x-axis (time) to obtain a signal that is a function of frequency only. Such a process has been implemented from the data in FIG. 1 to obtain FIG. 3; therefore, FIG. 3 represents a spectrogram averaged along the time axis according to the approach introduced in the above-mentioned article by Ramos. In this case, the Figure shows the appearance of frequency peaks, which correspond to the resonators' resonance frequencies. We note that the averaging carried out on the time parameter (x-axis between $\tau 1$ $\tau 2$–Tavg=$\tau 2$ $\tau 1$ is noted hereafter) makes the result independent of time.

The interest of this approach (change from 2D to 1D data after averaging) consists of applying conventional decoding from the result of FIG. 3 (1D curve). Conventional decoding is understood to mean that which is usually done on the frequency signal (response of the tag measured in frequency, for example, with a Network Analyzer or VNA) before spectrogram; as described in the article "Vena, Arnaud, Etienne Perret, and Smail Tedjini. "Chipless RFID tag using hybrid coding technique". *IEEE Transactions on Microwave Theory and Techniques* 59.12 (2011): 3356». The data in FIG. 3 is sufficient to detect the frequencies where the signal has a local maximum in the band being used by the tag (in particular, in the example described here, from 3 GHz to 6.8 GHz). As a function of these frequencies, a tag identifier may be determined. In FIG. 3, we see vertical lines (in bold, alternately shown in black, then grey to facilitate reading) which delimit areas or windows. The first window is defined between 3 GHz and 3.4 GHz (bold black line). The tag is designed to exhibit resonance in this area (a frequency peak shown in FIG. 3). Subdomains within this window are also shown in FIG. 3. There are 4 in this example, each benefiting from a frequency band of 100 MHz). The code is determined exactly where the peak is located within this window. For example, if the peak belongs to the first sub-domain, code 00 may be assigned to it. If it belongs to the second sub-domain, it is given the code 01, and so on, 11 for the $4^{th}$ sub-domain. This operation is repeated for each of the tag's resonances, and in this example, the tag's code could be presented in 7*2 bits (for the first 7 windows containing 4 sub-bands) plus 1 bit (for the 8th resonator where the last window contains only two sub-domains) The tag measured in FIG. 3 thus contains the information: 00 00 00 00 00 00 00 0.

The use of this approach showed that by going through the spectrogram and then defining a zone of this spectrogram, the temporal and frequency windowing thus carried out after averaging made it possible to recover the tag information in a noisy environment and without using a reference measurement. For these reasons, this approach is very successful, and this invention seeks to improve it. However, despite the advantages described above, the following may be noted: decoding is not performed on the spectrogram itself (2D data) but at the end of the averaging step performed on the spectrogram. However, switching from a spectrogram (2D) to a 1D signal comes at the expense of the amount of information present. Indeed, the 1D signal contains much less information than the 2D signal (in particular, a loss from the temporal information of the tag). This loss of information is damaging for detecting the tag, wherein a highly noisy environment, with the presence of a mobile object around the tag, is essential to optimise this post-processing as much as possible to minimise decoding errors. For this same reason, among other things, the precise information on the quality factor is lost; in other words, it is no longer possible to extract the quality factor Q from the 1D curve with sufficient precision. Therefore, this invention proposes a new way of proceeding where the relevant information for decoding the tag information (resonance frequencies and quality factors) is extracted directly from the spectrogram. An Approach Introduced as a Practical Illustration of this Invention:

After calculating the spectrogram as for example, in the above-mentioned article by Ramos, the characteristic according to this invention is based on the recognition of the 2D shapes present on the spectrogram. These shapes are the expression of the resonances of the resonators present on the tag. By recognising these shapes in the spectrogram, i.e. the position along the ordinate axis of the horizontally elongated shape as well as its duration relative to the x-axis, it is possible to deduce the resonance frequencies (relative to the ordinate axis) as well as the corresponding quality factors (relative to the x-axis), something that has never been done before.

The resonators used in the tag may be modelled in different ways; modelling is understood to mean being able to describe the ideal behaviour of these resonators as a function of time and frequency. They can therefore also be presented in the form of a spectrogram, the shapes of which may be used as reference shapes to further process the information. By way of example, these resonators may be modelled by an equivalent electrical circuit of the second order (system of the second order) having the following equation H as the transfer function:

$$H(\omega) = \frac{\frac{2\sigma j\omega}{\omega_r^2}}{1 + \frac{2\sigma j\omega}{\omega_r^2} + \left(\frac{j\omega}{\omega_r}\right)^2} \quad (1)$$

where $\omega_r$ and $\sigma$ correspond to the resonance pulsation and damping factor, respectively, of a second-order centre, $\omega$ is the pulsation, j pure imaginary value. The pulsation is directly related to the frequency by the expression $\omega=2\cdot\pi\cdot f$.

We, therefore, speak without making any distinction between the pulsation and the frequency of a signal. The big advantage of using a model like the one described by function (1) is that we know that it describes the behaviour of our resonant chipless tags and allows us to calculate a spectrogram. However, any other analytical or digital function similar to function (1) and describing the resonator used to make the tag may be used in this invention. Indeed, it is enough that these functions constitute a priori knowledge of the behaviour of the tag so that they may be used to extract the tag information in the measured signal.

In the ideal case given by equation (1), the quality factor Q can be extracted from the curve |H(ω)|(where | | denotes the modulus) using Q=frl (BW-3 dB), where the expression (BW-3 dB) corresponds to a bandwidth of −3 dB around the resonant frequency. The damping factor σ can be calculated using equation (2):

$$\sigma = \frac{\omega_r}{2Q} \quad (2)$$

Figure 4A:
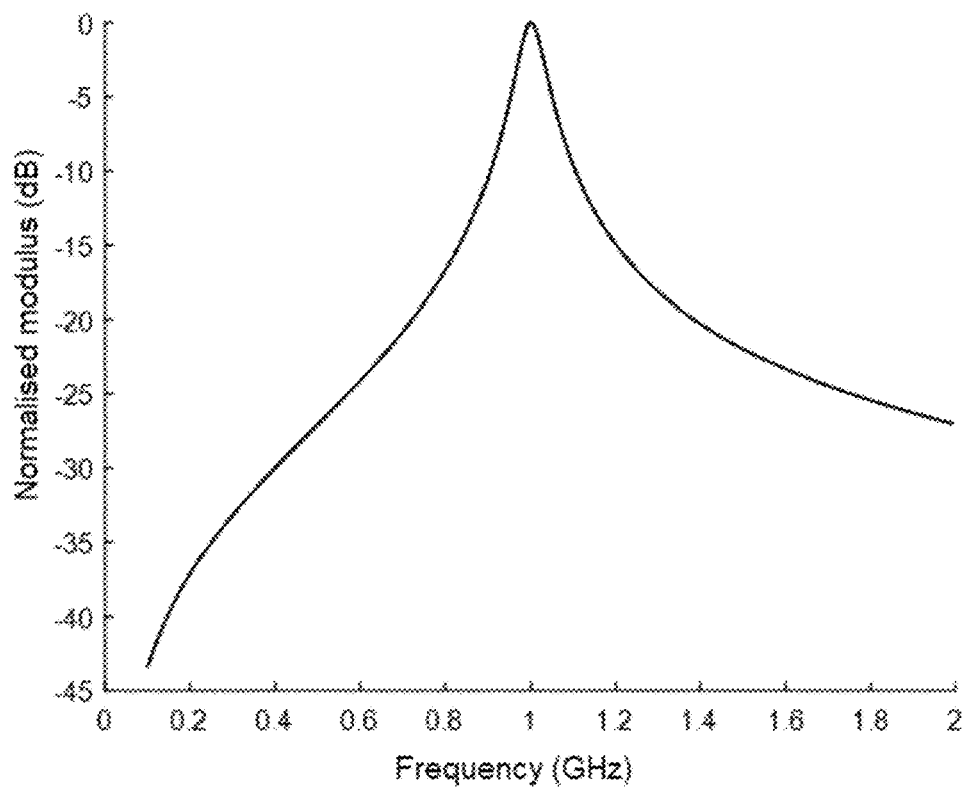
FIG. 4a shows the modulus $|H(\omega)|$, the transfer function $H(\omega)$ being defined by equation (1).
Figure 4B:
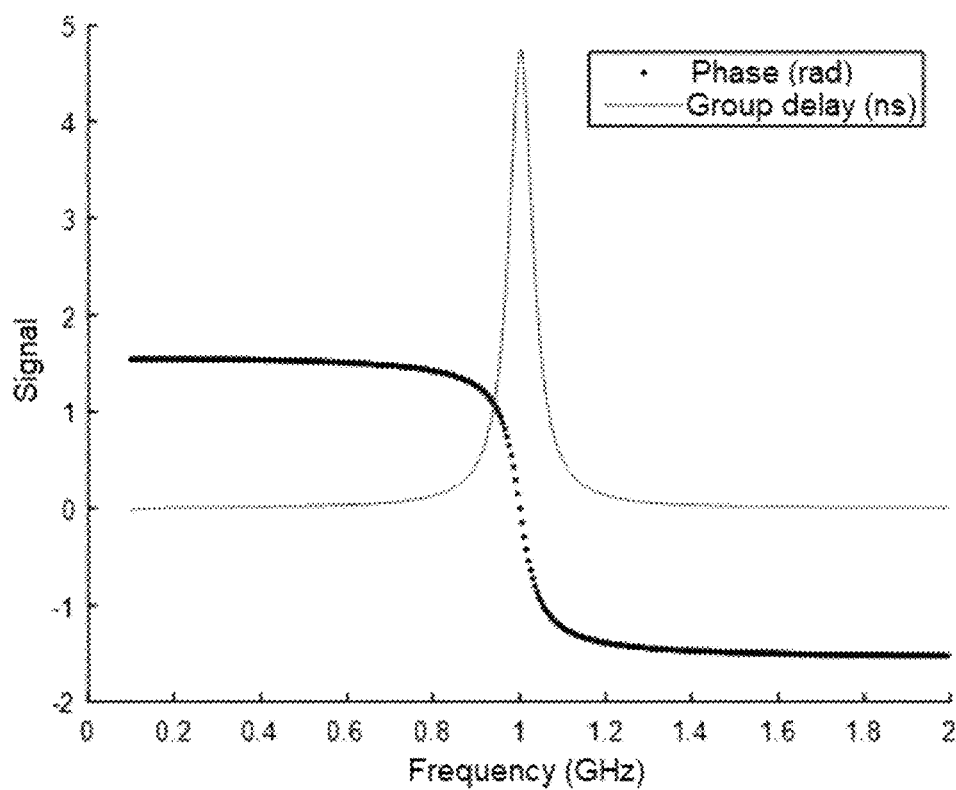
FIG. 4b shows the phase arg $(H(\omega))$ and the group delay of the transfer function $H(\omega)$ defined by equation (1).

Therefore, we speak without distinguishing between the damping factor and the signal quality factor; the two quantities directly relate to each other through expression (2). Thus from equation (1), it is possible to plot its modulus |H(ω)| and its phase arg (H(ω))) as shown in FIGS. 4*a* and 4*b*, respectively. A resonance mode (at 1 GHz) may be seen in these figures, which results in either a peak in the modulus or a 180° phase jump in the phase. The inflection point on the phase curve corresponds exactly to the resonance frequency, i.e. 1 GHz in the example. It should be noted that in practice, the use of the phase for the determination of the resonance frequency or the quality factor, although theoretically possible, is very seldom used. This is mainly due to the fact that this quantity is defined to within 2π, and when the measurement is carried out for a non-zero distance between the antenna and the tag (which is the case in practice), the signal obtained is very different from the one shown in FIG. 4*b* (the latter is equivalent to a zero distance), the latter becomes tilted and even more so as the distance becomes greater. Therefore, it is generally simpler to calculate the group delay of the phase, as shown in FIG. 4*b*. This consists of taking the opposite of the derivative of the phase as a function of the frequency. This transformation makes it possible to overcome the difficulty arising from the frequency phase tilt. In this representation, as shown in FIG. 4*b*, the resonance frequency corresponds to a peak in the group delay.

Figure 4C:
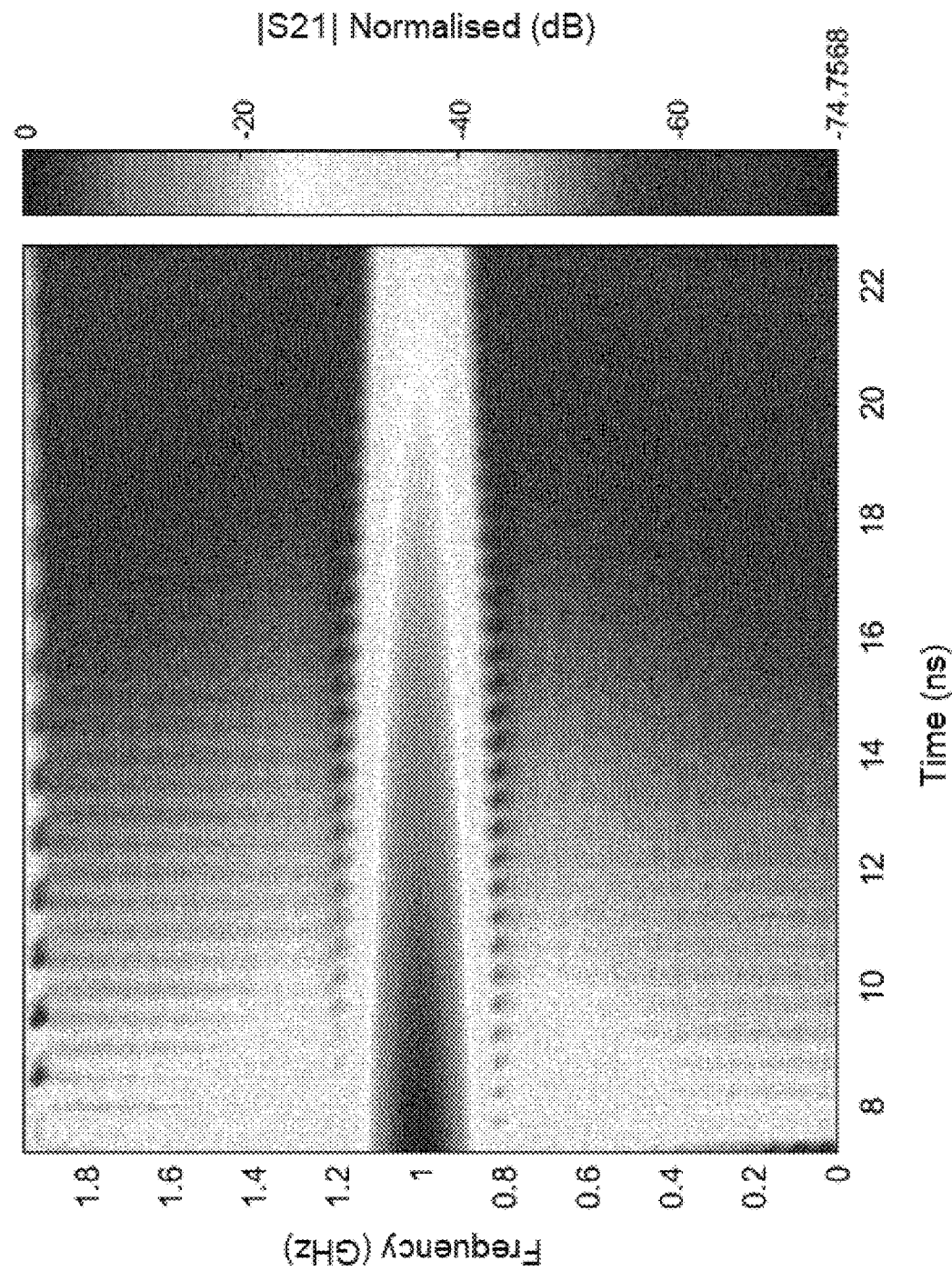
FIG. 4c shows the modulus of the spectrogram of the transfer function $H(\omega)$ defined by equation (1), with f0=1 GHz and Q=15
Figure 4D:
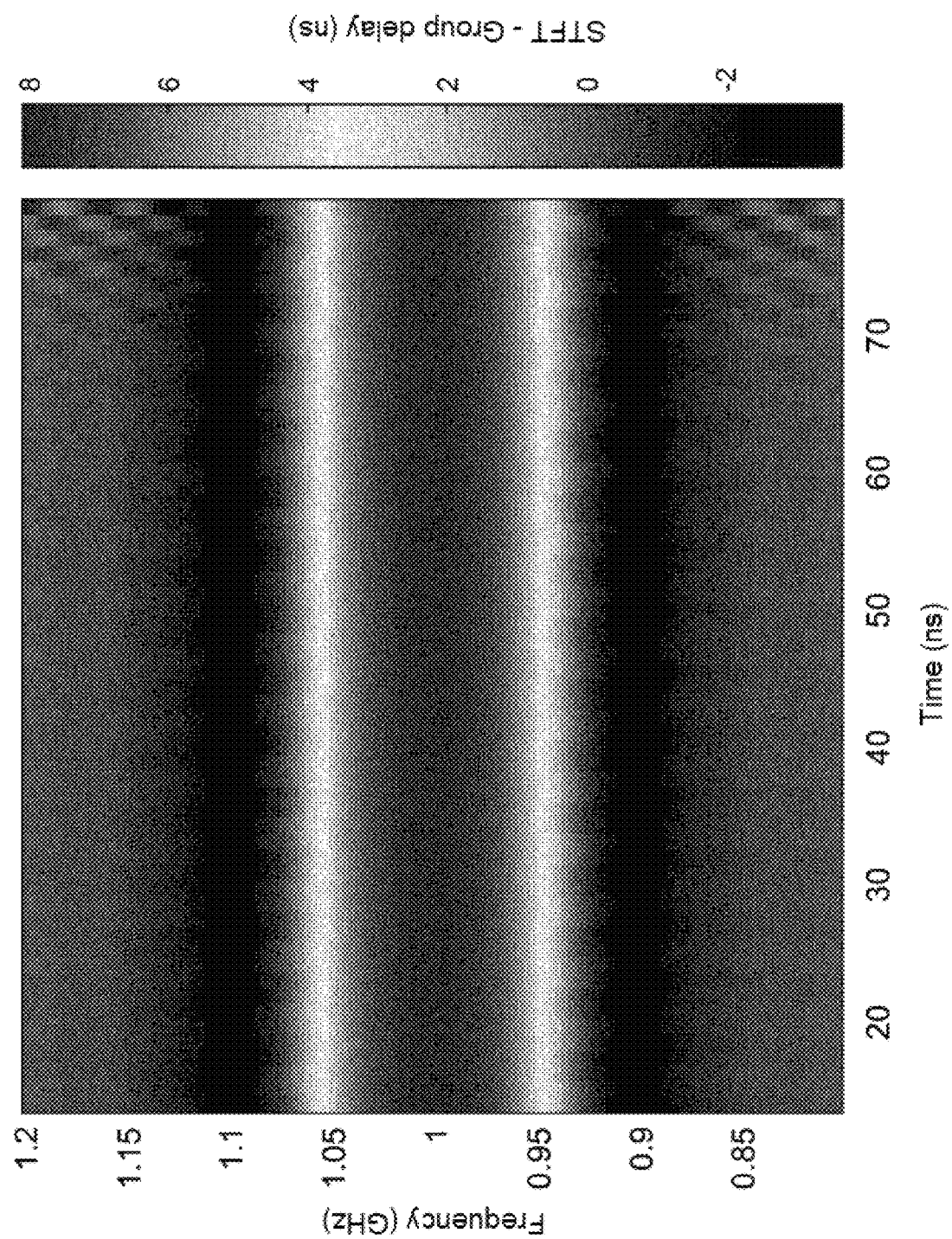
FIG. 4d shows the group delay calculated from the spectrogram phase (FIG. 4cbis) of the transfer function $H(\omega)$ defined by equation (1) with f0=1 GHz and Q=15.
Figure 4E:
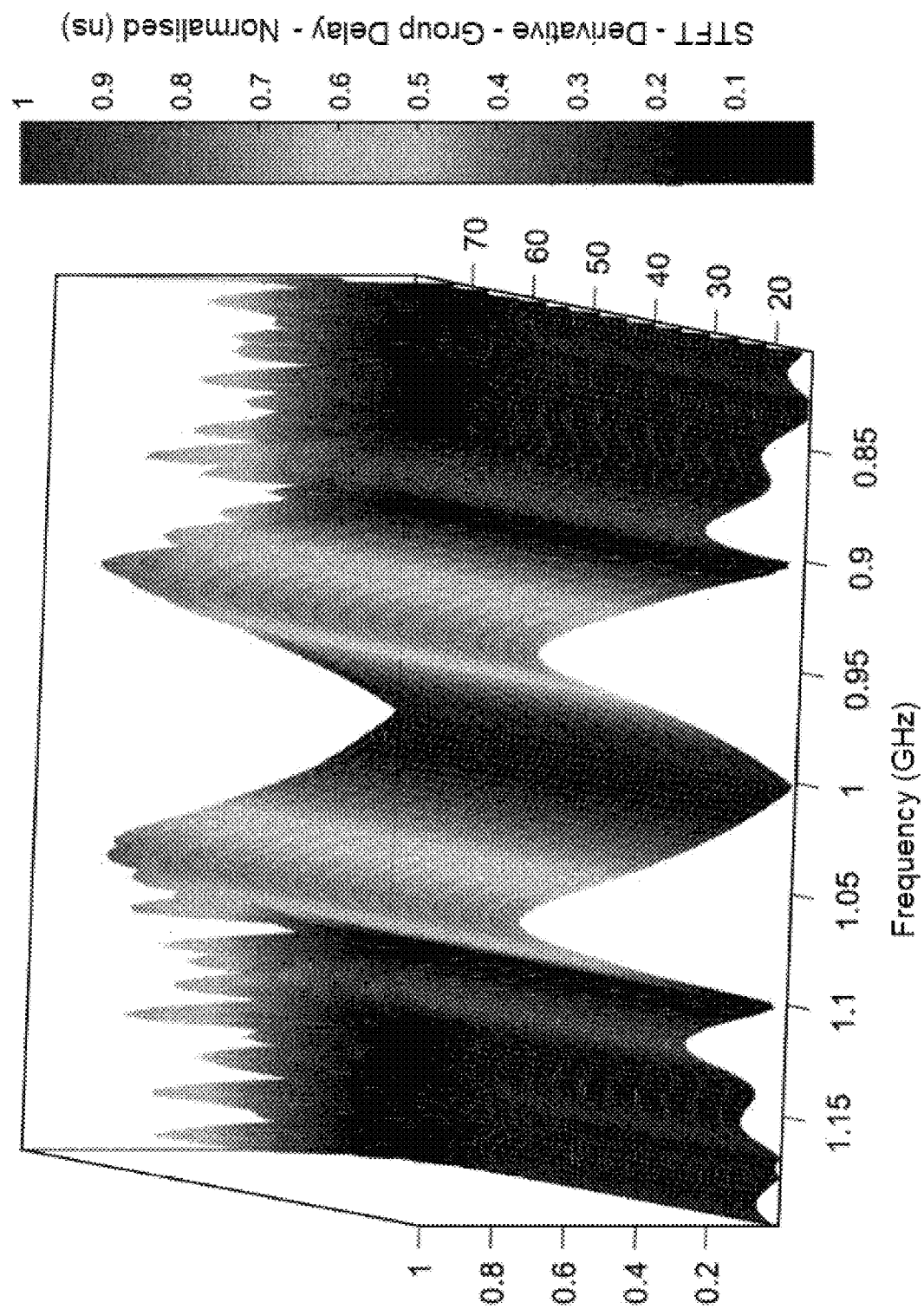
FIG. 4e shows the derivative of the group delay calculated from the spectrogram phase of the transfer function $H(\omega)$ defined by equation (1) with f0=1 GHz and Q=15.

Thus, in the context of this invention, it is possible to represent the spectrogram either in modulus (as in FIG. 4*c*) or in phase (as in FIG. 4*cbis*). Indeed, the result of the spectrogram transfer function H calculation (equation (1)) is an imaginary quantity, and it is, therefore, possible to consider either its modulus (FIG. 4*c*) or its phase (FIG. 4*cbis*). Furthermore, in the two figures mentioned, specific shapes may also be recognised that describe an ideal resonance mode. We note a change in curvature of the lines for the phase (see FIG. 4*cbis*), which, apart from the resonant frequency, are vertical lines (see the horizontal lines drawn in FIG. 4*cbis*). We observe a characteristic curvature of resonance around the resonant frequency (1 GHz). As for the difficulty of using the phase, here too, it is preferable to represent the group delay of the spectrogram phase. It should be noted that, to our knowledge, no one has ever used the group delay of the spectrogram phase to determine the identifier of a chipless RFID tag, i.e. to determine its resonance frequency or its quality factor. We note that unlike the modulus of the spectrogram, which decreases as a function of time, the group delay of the spectrogram phase is constant in time and remains maximum for the resonance frequency. It also presents a characteristic shape that is potentially usable for interpreting spectrograms of unknown targets. For example, if we perform the same processing on the radar measurement from any target (potentially from a chipless RFID tag), and if we recognise a horizontal shape similar to that shown in FIG. 4*c* or even in FIG. 4*d*, it is possible to deduce therefrom that the target comprises a resonance at the frequency 1 GHz. On the question of which form is the most relevant to carry out a comparison step to extract the parameters for the tag identifier, we note that a representation of the modulus type of the spectrogram or group delay of the spectrogram phase is preferred. However, we do not limit ourselves to these representations, any 2D representation that makes it possible to highlight specific shapes characterising the mode of resonance of the object may be used in the approach, which is the subject-matter of this patent. As an example, it is interesting to derive the group delay of the spectrogram phase as a function of frequency a second time. This takes us from FIG. 4e to FIG. 4f. In this new 2D representation, it can be seen that the resonance frequency (1 GHz) is characterised by a valley (minimum values centred on the resonance frequency) surrounded by two peaks. In practice, we observe that this type of representation is well adapted to perform shape recognition such as those described below.

The tags are designed based on electromagnetic simulations. In this way, we precisely know the ranges of values that the resonance frequencies fr and the quality factors Q of the tags produced take. For example, we can take a possible value of resonance frequency fr and quality factor Q to reconstruct a signal that one of our tags might have. In this instance, the signal backscattered by a resonator characterised by (fr, Q). Indeed, these a priori values may be used to plot the resulting expression of function (1) as a function of the pulsation ω. Similarly, it is possible to calculate the spectrogram based on the behaviour of this resonator (or of the tag; in this case, we consider all the resonators) as always, based on equation (1). FIG. 4c gives the spectrogram calculated from equation (1) with fr=1 GHz and Q=15. We find in FIG. 4c the characteristic horizontal shape of a resonance, which is found 8 times in FIG. 1, where the spectrogram of a real tag (from a measured signal) containing 8 resonators is presented.

From FIG. 4c (model of a resonator), it is possible to look for shape similarities with FIG. 1 (signal from the tag measurement). Mathematically, several solutions are possible. For example, this may be done by performing a 2D correlation between the data shown in FIGS. 1 and 4. FIG. 5 displays the result of this correlation operation where we can see that the maximums of the 2D curve thus obtained (represented by light grey lines) is found for the same resonance frequencies present in FIG. 1, namely the resonant frequencies of the measured tag. On this basis, we may extract the resonant frequencies very precisely.

Therefore, FIG. 5 represents the result of the 2D correlation carried out between the results presented in FIG. 1 and FIG. 4c. The light grey lines represent the frequency maximums for each time position.

This comparison of the spectrograms respectively measured and calculated using a mathematical function may be performed by any appropriate analysis method. By way of illustration, a topological analysis or even a conventional regressive mathematical analysis is cited, for example, partial least squares regression (PLS), multilinear regression (MLR), canonical regression and/or regression on a principal component (PCR). In addition to extracting the resonant frequencies from the fr=fri tag, it is possible to extract the values of the quality factors Q=Qi from each resonator numbered i to take into account the presence of several resonators within the tag. Indeed, to extract the quality factor, the 2D correlation operation is repeated, each time modifying the value of Q=$Q_{i\_cal}$ in equation (1). $Q_{i\_cal}$ being different values of quality factor chosen from the range of values of the quality factors of the tags, that is to say, values defined during the design of the tag as explained previously.

After all the calculations have been performed, the idea is to process the resulting (FIG. 5) resonant frequencies fri by the resonant frequency. For example, for the lowest resonant frequency noted here fr1 (according to FIG. 5), the light grey line having the coordinate 180 on the axis noted "frequency (point)" in FIG. 5 would be of interest. The value $Q_{i\_cal}$=Qi is identified, for which, compared to the other tested values of the quality factor, we have the maximum of the correlation factor corresponding to the light grey line relative to fr1. This value of the quality factor $Q_{i\_cal}$=Qi thus extracted is none other than the value of the quality factor of the resonator i=1, linked to the frequency fr1.

This process is repeated for the other frequencies, namely for the fri, i=[2.8] in the example used (tag characterised in FIG. 1). The values of the quality factors Qi of each resonator are thus obtained.

In conclusion, we can thus directly extract the characteristic parameters of each resonator i from the spectrogram: the resonant frequency fri and its associated quality factor Qi.

Therefore, in one embodiment, this invention provides a chipless radio frequency identification tag detection method in which the recognition of 2D shapes present on the time-frequency spectrogram includes the establishment of a calculated time-frequency spectrogram ("$C_{ana}$") from an analytical model representative of the resonances of the resonators of the RFID tag and a 2D correlation step by comparison of the $C_{mes}$ and $C_{ana}$ spectrograms. This comparison of the $C_{mes}$ and $C_{ana}$ spectrograms can therefore advantageously comprise a topological analysis or a conventional regressive mathematical analysis, for example, partial least squares regression (PLS), multilinear regression (MLR), canonical regression and/or principal component regression (PCR).

In particular, this method of detecting a chipless identification tag by radio-frequency is therefore characterised in that the recognition of the 2D shapes present on the time-frequency spectrogram comprises; 1) the establishment of a calculated time-frequency spectrogram ("$C_{ana}$") from an analytical model (written on the form of a transfer function) describing the presence of resonators on our tags, 2) the establishment of a calculated time-frequency spectrogram ("$C_{mes}$") from the signal measured by the reader, the signal comprising the response of the tag present in the tag reading area, 3) the establishment of a calculation of the 2D correlation type, making it possible to compare ("$C_{mes}$") and ("$C_{ana}$") so as to identify in the ("$C_{ana}$") data the characteristic shapes present in ("$C_{mes}$"), which, once determined, make it possible to deduce the resonance frequencies of the tag (and therefore its identifier) precisely and optionally, the quality factors thanks to this correlation, while under measurement conditions involving noise.

Therefore, we may also say, in a more general manner, that the recognition of 2D shapes present on the time-frequency spectrogram includes the establishment of a time-frequency spectrogram calculated from an analytical model ("$C_{ana}$") of another time-frequency spectrogram calculated from the signal measured by the reader ("$C_{mes}$"), appearing based on a numerical calculation seeking to identify in ("$C_{mes}$") areas shaped similarly to those in ("$C_{ana}$") and by the optional extraction of resonant frequencies and quality factor through this comparison.

Figure 6:
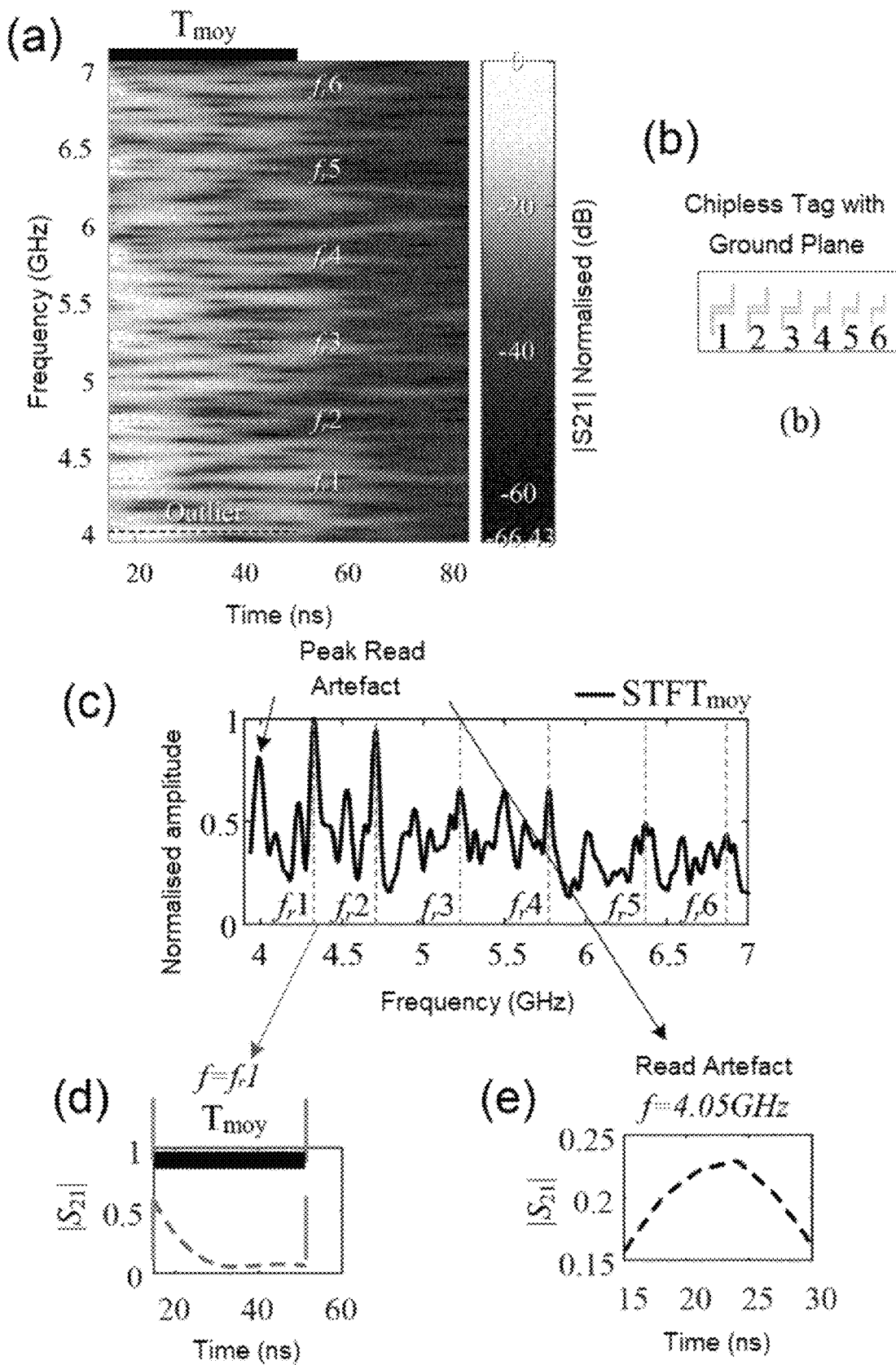
FIG. 6 is subdivided into 5 sub-figures which represent respectively (a) the spectrogram from a measurement of a tag in a real use configuration; (b) the tag used for the measurement; (c) the time-averaged signal calculated over the Tavg interval; (d) the evolution of the signal for f=fr1 (first resonance frequency) as a function of time; and (e) the evolution of the signal for f=4.05 GHz (frequency other than a tag resonance frequency) as a function of time.

The comparative tests carried out between the reference method in the above-mentioned "Ramos" article and the method presented here show detection is of much higher reliability in a real environment for the method introduced. It can easily be understood as follows. In a real environment, the signal recovered by the reader contains, in addition to the signal reflected by the tag, signals originating from the reflection on other objects (certain objects which may be mobile as explained previously), or even simply a signal resulting from the coupling between transmission and reception. This is why the signal recovered in such a case is significantly disturbed by these spurious signals; this phenomenon is inherent in use for real application (and not in the laboratory). The spectrogram of a signal measured in a real application is shown in FIG. 6. We can see the presence of artefacts related to the superposition of signals other than those related to the tag. On the averaged spectrogram (FIG. 6*b*), we see the presence of peaks at frequencies, which do not correspond to the resonances of the tag. If the peak detection method (described previously) is applied to this signal for decoding the information (tag ID) as described in FIG. 3, the identifier obtained is incorrect, which implies that the tag cannot be read correctly (the returned ID is not that of the tag). On the other hand, when we look at the spectrogram approach, as shown in FIG. 6*d*, it is possible to differentiate between a read outlier and a true resonance of the tag. Indeed, suppose we are interested in the presence of an elongated area with a certain signal level (see for example, the area around 4.1 GHz called outlier—area apparently very similar to a resonance of the tag, also showing a peak on the averaged representation—FIG. 6*b*). In that case, it is interesting to represent the evolution of the signal as a function of time using as the frequency a local maximum (here 4.1 GHz). It is expected to have an exponential decrease for a resonator, like that shown in FIG. 6*c* or described in expression (1). This decrease is in all points identical to that shown on the curve in FIG. 4*c* when we also consider the frequency corresponding to the local maximum. On the other hand, the presence of an artefact linked, for example, to too low a signal-to-noise ratio or a moving object is characterised by a completely different variation, like that shown in FIG. 6*d*. Through this example (which is the same for the other artefacts visible in FIG. 6*b*, where peaks are present at frequencies other than those of the resonances), the spectrogram (2D signal) contains more information and turns out to be more relevant for tag decoding. The method presented here based on shape recognition (the shape that a resonance takes in a time/frequency spectrogram representation) uses this information. It proves to be very efficient in differentiating the resonances of artefacts linked to noisy reading, which we find in a real application.

FIG. 6 illustrates respectively (a) the spectrogram resulting from a measurement of a tag in a real configuration of use, (b) the Tag used for the measurement, (c) the time-averaged signal calculated over the Tavg interval, (d) the evolution of the signal for f=fr1 (first resonant frequency) as a function of time, and (e) the evolution of the signal for f=4.05 GHz (frequency other than a resonant frequency of the tag) as a function of time.

Figure 7:
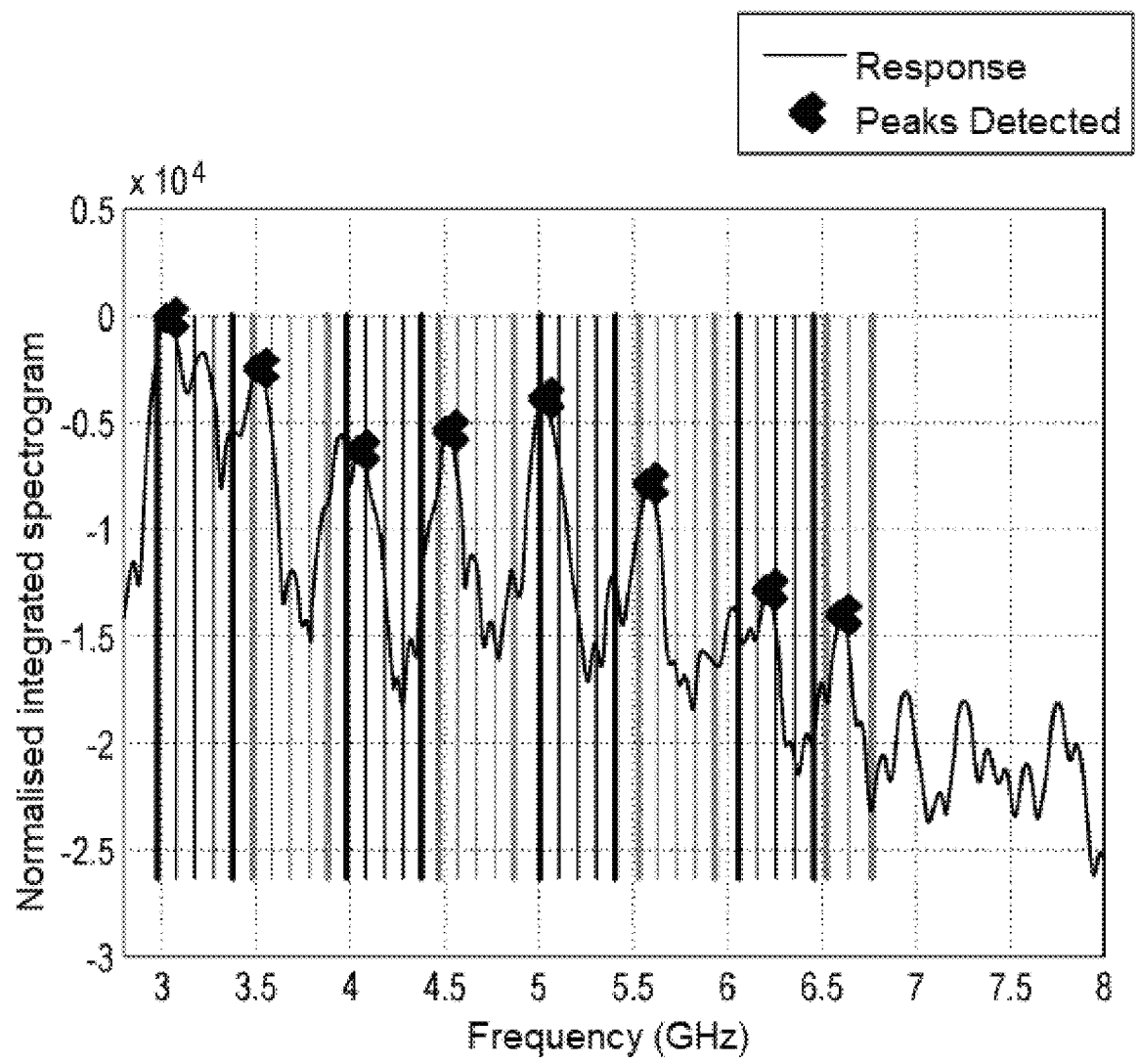
FIG. 7 shows the averaged spectrogram from a tag measurement in a real environment (the measured tag is shown in FIG. 2).
Figure 8:
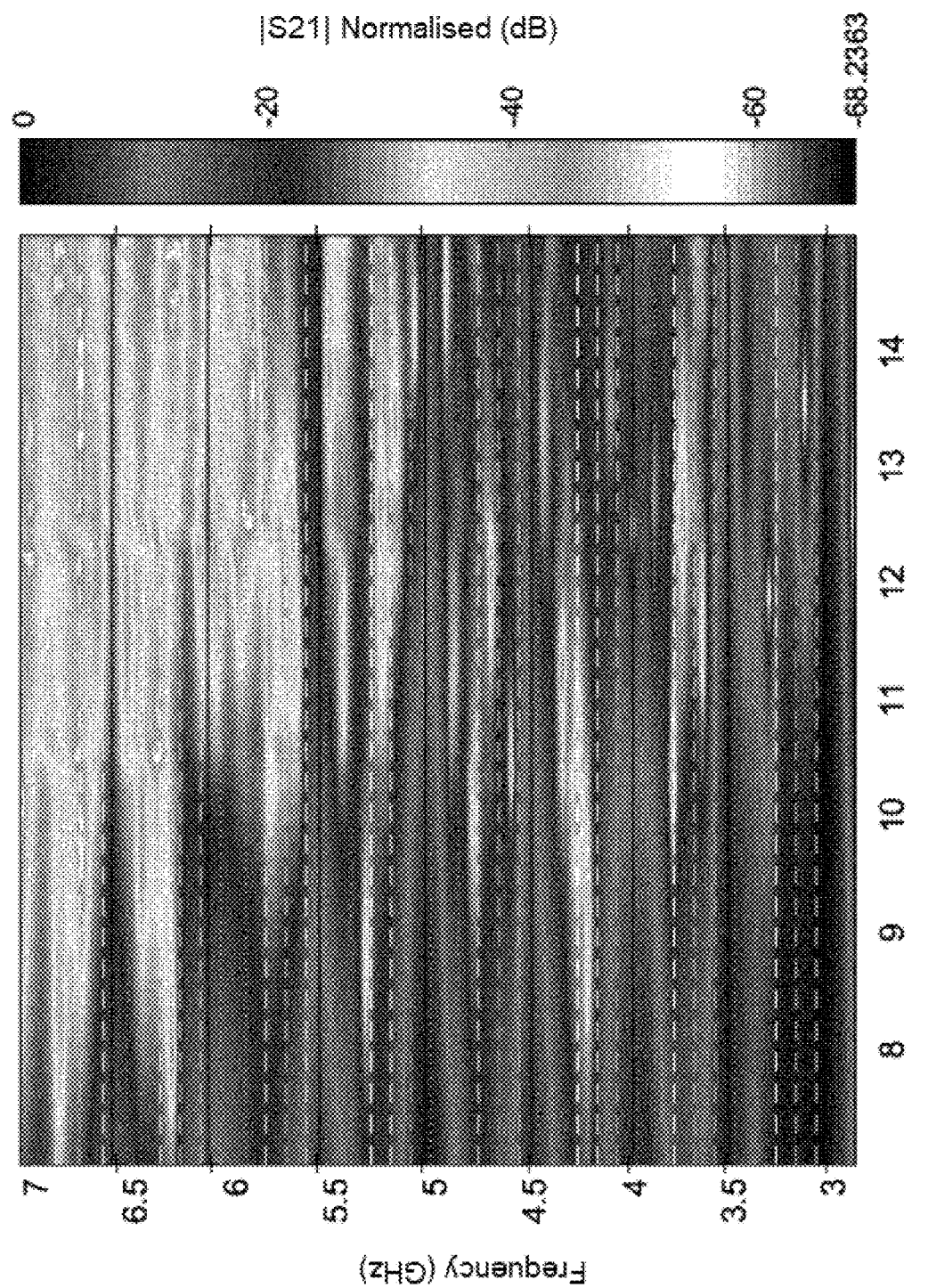
FIG. 8 shows the averaged spectrogram from a tag measurement in a real environment (the measured tag is shown in FIG. 2).

Here we present a final illustrative example of the advantage of decoding by using the spectrogram rather than the averaged signal from the spectrogram in the "Ramos" article above. The tag shown in FIG. 2 (8 resonators) is read in a real environment 17 cm from the antenna. It contains the identifier 00 00 00 00 00 00 00 0, i.e. the set of resonant frequencies must be positioned in the smallest frequency sub-domain (inside each detection window). The averaged spectrogram is shown in FIG. 7. We observe the code: 00 00 00 00 00 00 01 0. Indeed the $7^{th}$ detected peak is positioned on the second subdomain, which leads to a reading error. The same signal (same spectrogram) is used with the claimed approach. The result is given in FIG. 8, where the black horizontal bars correspond to the frequencies detected by the 2D spectrogram-based approach. We see that they all belong to the first subdomain of each window leading to the correct identifier 00 00 00 00 00 00 00 0.

From the STFT spectrogram of the tags, the possibility of extracting the resonant frequency and associated quality factor pairs constitutes a very important advance for the world of the customised chipless RFID.

Decoding based on the use of the backscattered signal phase:

Therefore, the first approach consists of carrying out the decoding from the transfer function modulus (1), all by using a representation of the spectrogram type and by carrying out a comparison with a reference shape coming from a priori knowledge of the tag. Insofar as the relevant information of the tag, namely its resonant frequency and its quality factor, are also present in the transfer function phase and, in practice, the phase measurement may be carried out independently of that of the modulus, it seems judicious to also try to use the phase to roll back to this same information. If we consider that we are able to extract the information from the tag through these two independent approaches; we can consider two cases from Figures: 1) either the two measurements (modulus and phase) are affected by noise in the same way, and therefore we obtain a small improvement (relating to the knowledge only of the information extracted from one (or exclusively) or the other magnitude) by averaging the two results to obtain the final information. 2) Either for a reason related to the propagation channel, to the immediate environment of the tag, or even to the reader itself (or another), the measurement of the modulus is marred by error leading to the extraction of an incorrect identifier, in this case, it is wise to use the identifiers linked to the use of the phase to associate the correct identifier. In practice, it is probable that on a system allowing the measurement of the phase and the modulus, it is not possible to determine which quantity is correct or not. In this case, there is still an advantage to using these two extraction means by saying that it is preferable to associate an identifier with the measured object only if the results coming from the phase and the modulus are close to each other. This approach has the advantage of making it possible to significantly reduce false readings, which today remain a very important problem for identification systems. Indeed, it is much more damaging to report a false identifier than to fail to read the tag identifier.

Practical Implementation of the Phase-Based Method:

The process is similar to that based on the use of the modulus. The objective is to represent the measured signal as well as the reference signal obtained from a model (like the one given by equation (1)) in a 2D shape. From these two representations, a comparison between the two make it possible to see how the modulus identifies shapes similar to those of the model based on the measurement. The results of this comparison allow us to go back to the resonant frequency or the quality factor. For this, a representation type derived from the group delay calculated over the spectrogram phase is particularly well suited. To recognise the quality factor, we note that according to function (1), it is possible to relate the width of the characteristic valley in FIG. 4*e* to this factor. The operation to perform the comparison may be the same as that used for the modulus-based approach. However, since the shape of the 2D representation for the phase is not a function of time (unlike that for the modulus), approaches that are simpler than 2D correlation may also be used with success. For example, calculating the integral compared to the frequency of the difference of the moduli of the two 2D curves (FIG. 4e) is possible for each position of a 2D curve compared to the other (measurement compared to the model). The minimum returned by this calculation corresponds to the position in which the two curves present similarities. It is also possible to detect the resonance frequencies from this approach.

Figure 4F:
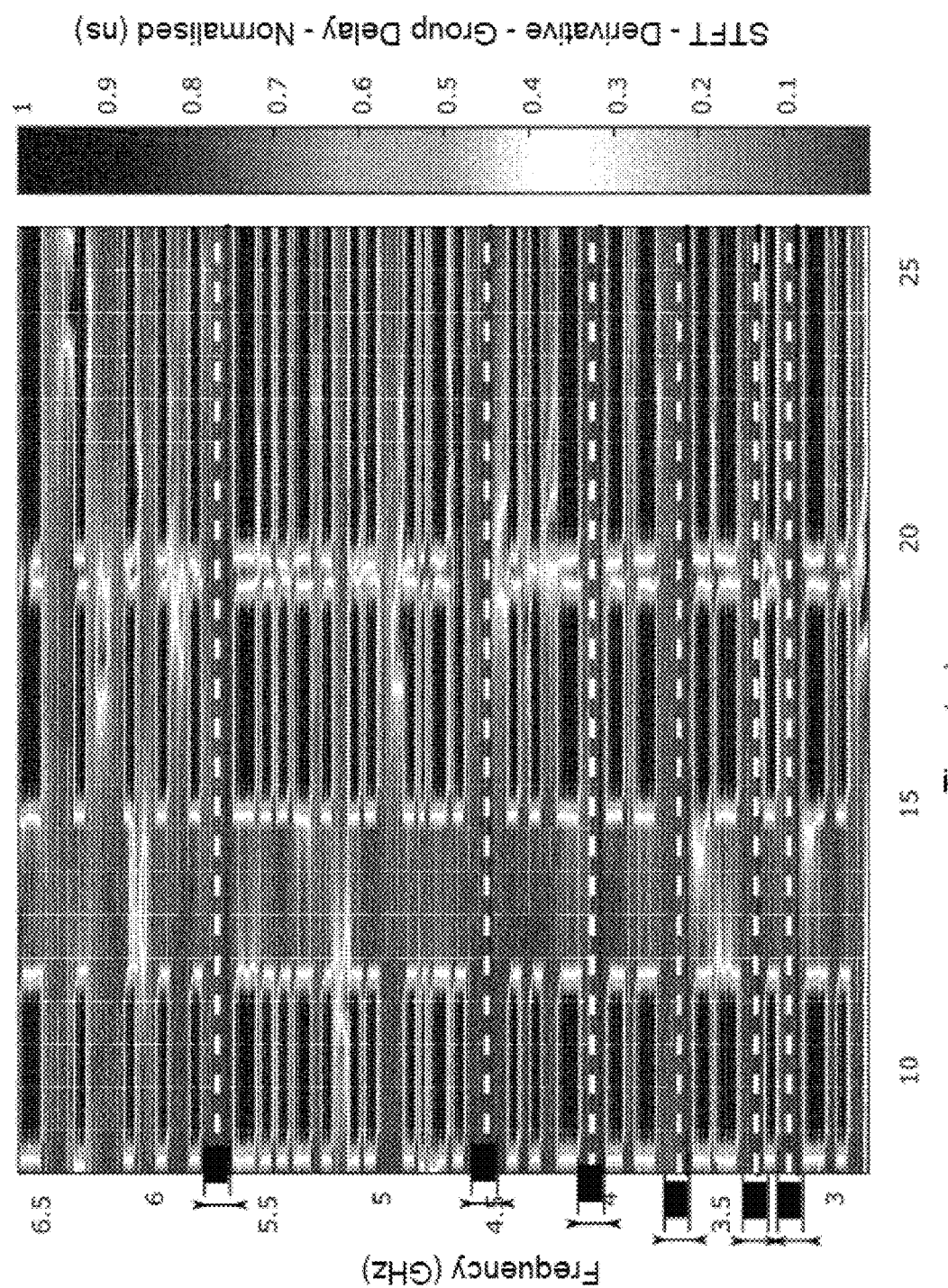
FIG. 4f shows the derivative of the group delay calculated from the spectrogram phase of the transfer function $H(\omega)$ defined by equation (1) on a measured signal from a chipless RFID tag.
Figure 5:
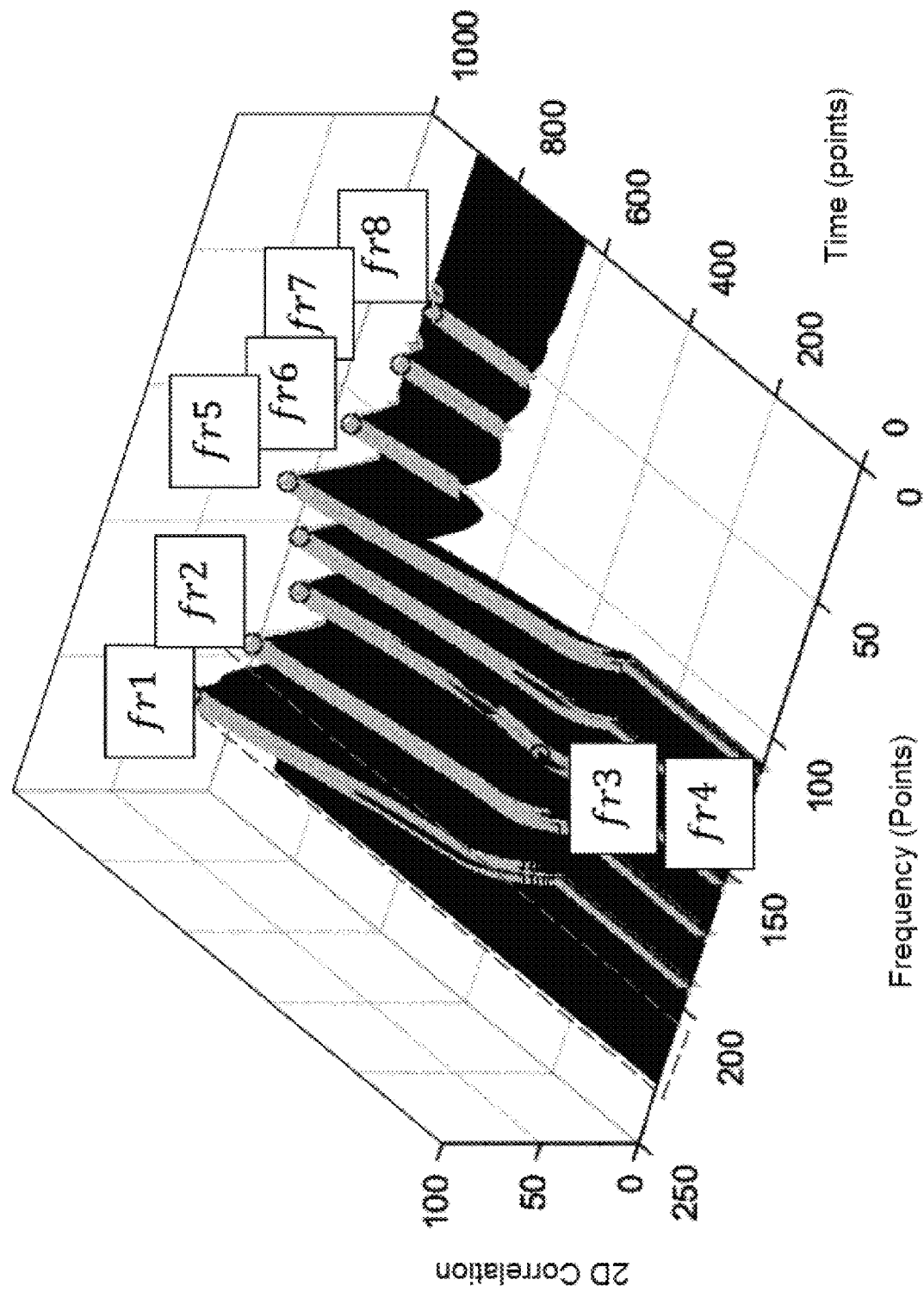
FIG. 5 shows the result of the 2D correlation applied between the signals presented in FIG. 1 and FIG. 4c. The light grey lines represent the frequency maximums for each time position. The light grey lines represent the frequency maximums for each time position. These 8 lines correspond to the 8 resonance frequencies of the tag whose measured spectrogram is shown in FIG. 1. These frequencies are numbered fri with i=1 to i=8.

FIG. 4f shows an example of a practical implementation of this approach where we can see the representation of the derivative of the group delay of the spectrogram phase. A measured signal from a tag with 6 resonances was used. For reference, it is the representation given in FIG. 4e that is used. We can very clearly see the presence of valleys that characterise resonances at the frequencies that are those of the tag read.

Signal Extraction and Transformation

Therefore, this invention is characterised by extracting the backscattered signal using a time-frequency transformation, making it possible to establish a corresponding spectrogram. Any time-frequency transformation that allows the establishment of a corresponding spectrogram may advantageously be used in the context of this invention. By way of illustration, the transformations of the STFT type "short-term Fourier transform", Gabor decomposition, and/or wavelet transform are cited, in the context of this invention, it is the short-term Fourier transform that has been favoured. The latter is widely used, which means that calculation codes optimised for the architecture of consumer computer microprocessors are available and easily unsuitable for use. The result is that computing time is often significantly reduced, making it easier to use with mobile readers or reduced computing capacity. Furthermore, this reduction in computation time to extract the identifier from the tag usually reduces the time it takes to read a tag, which is also important for industrial applications.

For example, it is possible to advantageously use either a continuous local Fourier transform or a discrete local Fourier transform.

An example of a continuous local Fourier transform is that described in the article titled *"Temporal Separation Detection for Chipless Depolarising Frequency-coded RFID»* (Angle Ramos, Etienne Perret, Olivier Rance, Smail Tedjini, Antonio Lazaro, and David Girbau; *IEEE Transactions on microwave theory and techniques*, vol. 64, No. 7, July 2016, page—2326-2337).

In practice, a discrete local Fourier transform is programmed on a computer. It is calculated using dedicated FFT (Fast Fourier Transform) calculation libraries. The function ω is most often a simple rectangle function of a certain duration T.

By way of illustration, it is mainly this datum T (duration over which w is non-zero—or even equal to 1 in the case of the rectangle function) that we define according to our tags. Ideally, the larger T is, the more precise the spectrogram is in frequency. Conversely, if T is much greater than the time during which the tag restores the power it has stored, we significantly increase the noise in the signal and therefore deteriorate the result. So the choice of T is linked to the tag and results from a compromise.

Tag

As already explained, this invention also relates to a customised chipless RFID tag that may be used in the detection method and/or the identification method claimed; said tag having the following characteristics:

A conductive pattern or a set of conductive patterns characterising its geometry, preferably with at least one or more or all asymmetric patterns, Characterised by its identifier, which includes at least one resonant frequency fr and preferably at least one quality factor Q, Resonating on an ultra-wide frequency band (UWB) characterised by a bandwidth greater than or equal to 500 MHz, preferably between 3.1 and 10.6 GHz, With or without a ground plane, and Polarising or preferably depolarising.

Tag—Geometry

Figure 9:
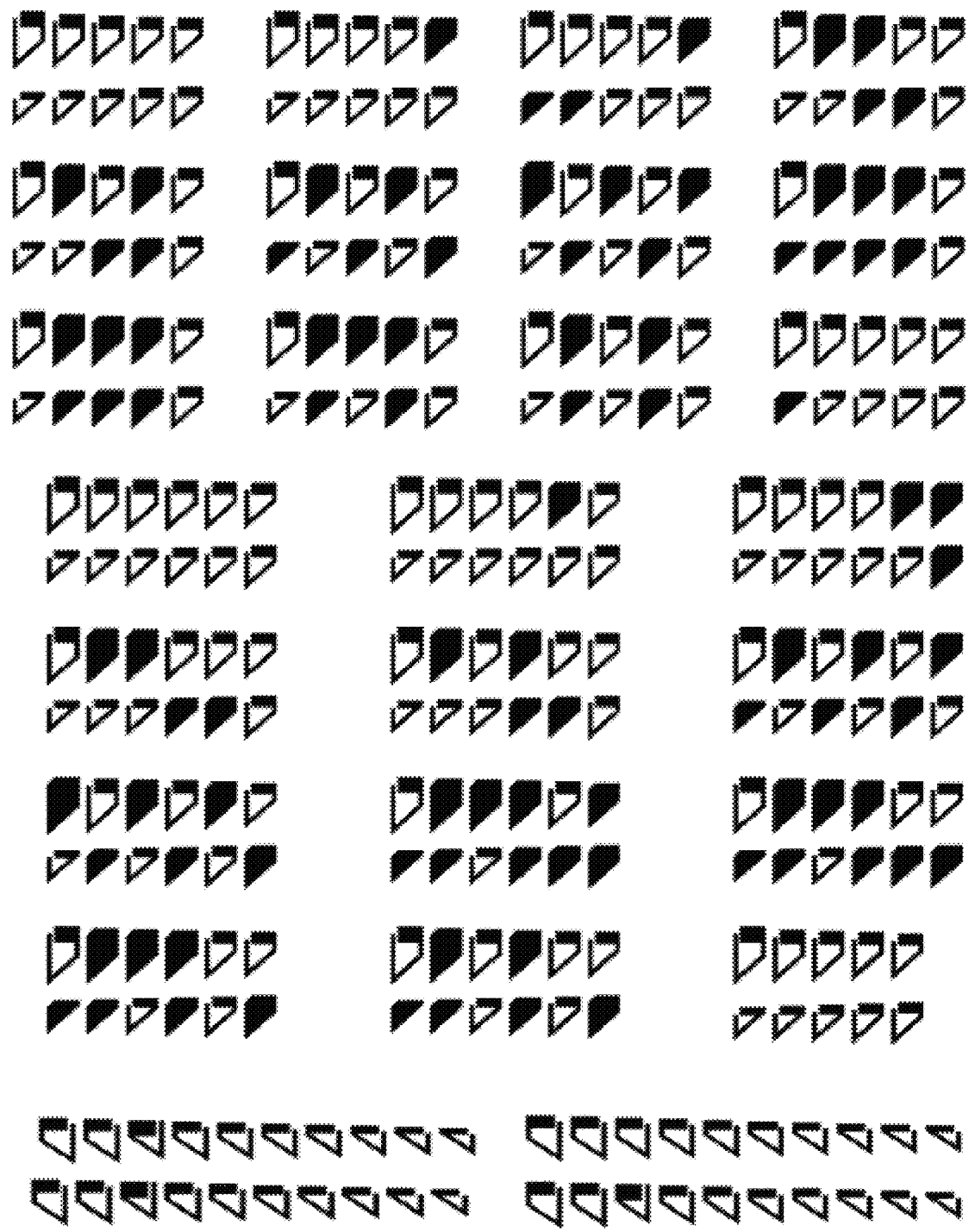
FIG. 9 shows different tag geometries made in connection with the claimed method. As an example, the 4 bottom tags (one-line tag) have different quality factors at the 3rd resonator (from the left), with the same resonance frequency.
Figure 10:
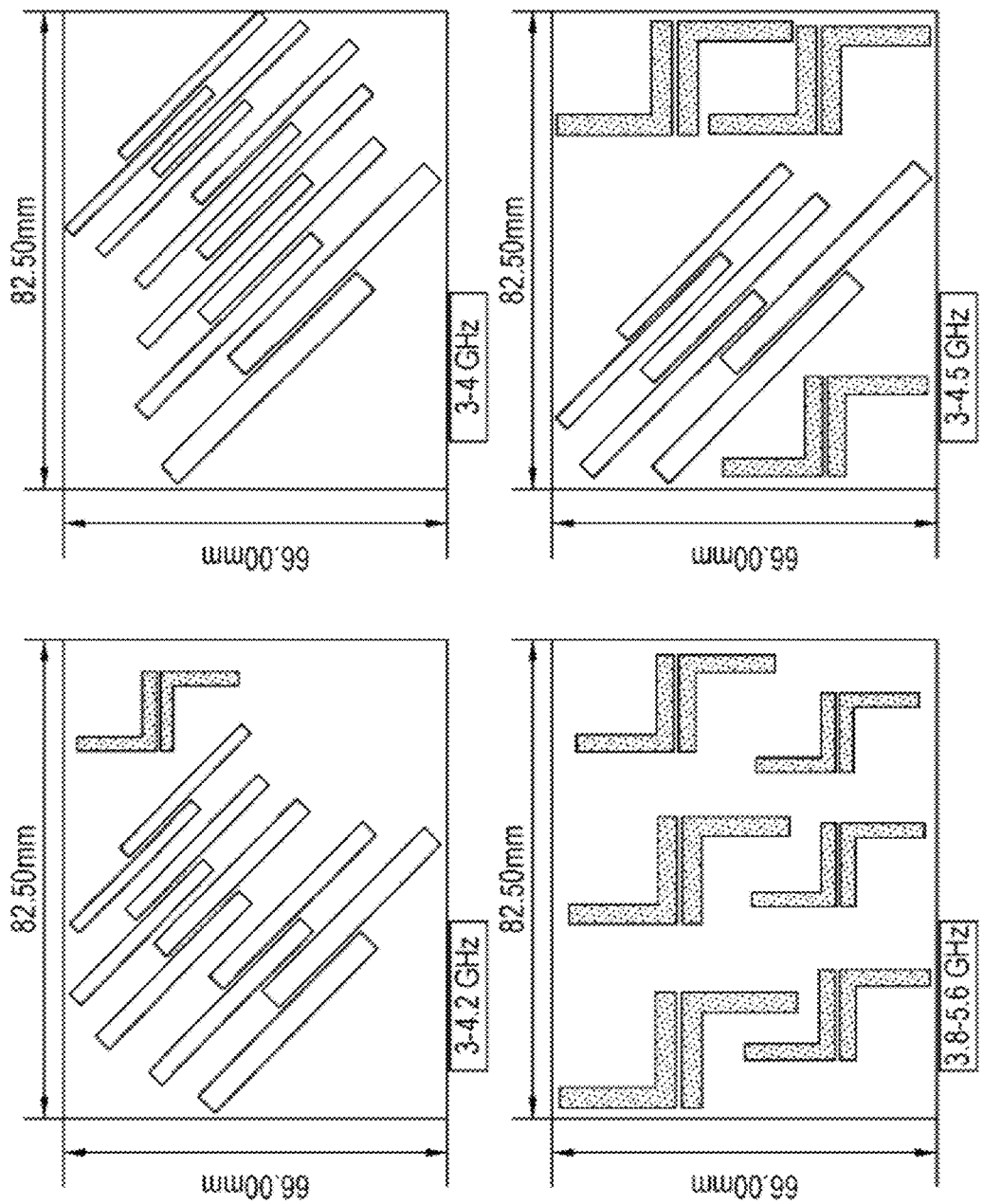
FIG. 10 shows different tag geometries made in connection with the claimed method. The four tags shown have six resonators each. Two families of resonators (double L shape—in dark grey—and double parallel line shape tilted at 45°—in lighter grey) are used to optimise tag performance. The frequency band on which the resonant frequencies of each tag fall is indicated at the bottom left of each tag.

Due to the coding possibilities offered by the claimed method, the applicant has also developed a whole range of novel tag families. Thus, in one particular embodiment, a tag is preferably composed of at least one pattern, preferably at least two asymmetric patterns. By way of example, FIG. 9 shows the tags without a ground plane made specifically for the claimed method. FIG. 9 shows different tag geometries made in connection with the claimed method; as an example, the 4 bottom tags (one line tag) have different quality factors at the $3^{rd}$ resonator (from the left), with the same resonance frequency. Likewise, FIG. 10 shows tags with ground planes also produced specifically for the claimed method.

Tag—Identifier

According to this invention, the tag is preferably characterised by an identifier that comprises at least one resonance frequency fr and at least one quality factor Q, each of which may be calculated by means of the claimed method. An advantage of the tags according to this invention is that small changes in their geometry make it possible to obtain tags With discriminating resonance frequency and/or With discriminating quality factors, something that has never been done before.

Resonant Tag

According to this invention, the tag is resonant on an ultra-wide frequency band (UWB) characterised by a bandwidth greater than or equal to 500 MHz, preferably between 3.1 and 10.6 GHz.

Passive Tag

As already explained in the introductory part, our type of chipless radio frequency identification device requires neither an integrated circuit nor discrete electronic components, such as a transistor and/or a coil and/or a capacitor and/or an antenna. Therefore, this type of device is characterised by passive behaviour because it must not integrate a local power source (such as a battery).

As a reminder, the word "device" is to be understood as a packaging, a document, a tag, in particular, a security document as well as possibly any object and/or living being upon which chipless RFID labelling may be carried out or upon which a support for the labelling may be attached.

Tag with or without Ground Plane

According to this invention, the tag may be characterised in that it has or does not have a ground plane. In its simplest form, a tag with a ground plane is defined as a structure comprising a flat dielectric substrate with a thickness generally less than 1 mm and greater than 10 μm sandwiched between two metal layers (with a thickness conventionally between 50 nm up to 50 μm); the total of the layers (metal—dielectric—ground plane) could, for example, have a thickness of 0.1 to 2 mm. By way of explanation, the layer of the conductive pattern representing the tag is considered to surmount the dielectric substrate, and the other conductive layer is located under the dielectric substrate. The ground plane, therefore, corresponds to the metal layer located under the dielectric substrate. Its surface may be identical or greater than that of the conductive pattern located on the dielectric substrate, provided that it covers at least one surface symmetrical to said pattern with respect to the plane of the dielectric substrate; for ease of design, its surface may also be selected to fully match that of the substrate. Will the second metal layer be shaped to have a particular geometric shape corresponding to the patterns of the tag (like the patterns shown in FIG. 2). Therefore, a tag with a ground plane is a structure comprising two metal layers, whereas its analogue without a ground plane comprises a single layer, i.e. the one where the tag's pattern is created (as in FIG. 9). Once positioned on the ground plane side of an object, a tag with a ground plane has the advantage of isolating the tag from the object from an electromagnetic point of view. In this case, the influence of the object on the tag is less than with a tag without a ground plane. However, the presence of the ground plane makes it difficult to make the tag: in addition to having a metal layer (often the most expensive part of the tag due to the material, but also the size), it is no longer possible to print the chipless tag directly on the object to be identified. In many applications where a product's life contained in a cardboard package is to be traced, the simplest and therefore least expensive solution is to print the metal layer relating to the tag pattern (see FIG. 9) directly onto the cardboard, which acts as a dielectric substrate. On the other hand, the performance of the tag is degraded insofar as this substrate does not work as well as a substrate that has been selected for its performance from an RF point of view, which has the advantage of presenting less loss and therefore making it easier to read the tag.

However, it should be noted that in the case of a tag with a ground plane, a solution based on using cardboard as a substrate is possible, provided that the two metal layers that enable a chipless tag to be produced may be printed on both sides of the card. The main limitations here are 1) ensuring good alignment between the two metal layers, 2) in this configuration, losses in the cardboard affect the performance of the tag in a more noteworthy way than in the case without a ground plane, insofar as the structure with a ground plane further concentrates the field between the two metal layers, specifically, at the level of the cardboard substrate (necessarily with losses, unlike the air which can be considered as a lossless material).

Therefore, this invention is advantageously applicable to both tags without a ground plane and to tags with a ground plane.

Depolarising Tag

According to this invention, the tag is preferably characterised in that it is polarising or preferably depolarising. A depolarising tag is a tag capable of emitting a wave with a polarisation oriented perpendicularly to that incident (we speak of cross-polarisation reflection or cross-polarisation in English).

Reader

By way of illustration, in the context of this invention, the reader is a transceiver of electromagnetic waves; the operating principle of the said reader is based on the emission of an electromagnetic signal in the direction of the identification device (e.g. the tag), which reflects said signal according to its geometry (and for example its own resonance characteristics) and on the reader's capture of said reflected signal. Thus, the processing of the received signal (notably through a decoding step) allows the information contained in the device (e.g. the label/tag) to be traced. Thus, in general, the chipless radio frequency identification devices according to this invention are part of an RFID system which also comprises one or more RFID readers which may or may not be connected to supervisory computers themselves or to an electronic card which performs processing which may, for example, create a link to existing databases. Therefore, these readers make it possible to identify objects by using the RFID tags affixed to them, said chipless RFID tags being comparable to a static radar target with a specific electromagnetic signature. Thus, in one particular embodiment of this invention, chipless RFID readers are thus similar to radar in terms of operation, such as an airborne radar detecting aircraft's signature at a ratio of scale and power. By way of illustration, RFID tags without a chip may be seen as radar targets having a particular time or frequency signature. Any type of radar suitable for the reception/identification of the back-emitted signal by the RFID tag could advantageously be used within the framework of the invention; by way of illustration and without limitation, we cite impulse radar.

According to this invention, the coding capacities obtained by means of the chipless radio frequency identification devices meet the standards in force because the tags obtained make it possible to have at least 40 bits of information that corresponds to barcodes of the EAN13 type. By way of illustration, values of more than 40 bits for a credit card format [i.e. $40/(85.60 \times 53.98 \text{ mm})=40/46$ bits/cm$^2$] have been obtained; thus, in one particular embodiment according to this invention, the claimed devices are characterised by a coding capacity value greater than 0.85 bits/cm$^2$, for example, greater than 1 bit/cm$^2$, greater than 2 bits/cm$^2$, or even greater than 5 bits/cm$^2$.

In an alternative embodiment of this invention, the substrate upon which the tag is affixed (preferably printed) may be selected from a large number of materials and not be considered as limited to materials frequently used in standard printing devices and/or customisation such as paper, cardboard, and plastic substrates. Non-limiting examples may be mentioned, such as metal, paper, nonwoven fabric, plastic, for example, a methacrylic copolymer, polyester, polycarbonate, polyethene, polypropylene resins and/or polyvinyl chloride resin, or even cellulosic type materials such as, for example, wood, plywood, or crystalline materials such as glass or ceramics, such as complex materials comprising one or more of these components such as milk cartons.

According to this invention, the substrate (paper, card, etc.) is generally in a rectangular or square shape. This sheet moves, usually via a substrate transport system in a printing machine, along a transport path oriented adjacent to a longitudinal axis from at least one storage input providing printable and/or customisable substrates to at least one storage outlet receiving the printed and/or customised substrates, and therefore covered with traces of conductive material in accordance with this invention. The "side edges" of the substrate are the two edges located on either side of this longitudinal axis; the front and/or rear edges are its transverse edges. The substrate may also be in the form of a coil in a machine of the coil-coil type.

Therefore, the preferred strategy introduced in this invention consists of detecting shapes on the measured signal using reference shapes that constitute a priori knowledge of the operating mode of the resonators used to produce the tag. This type of resonator has been studied for many years, and those skilled in the art are able to model them precisely by considering them as second-order systems. But, of course, we are speaking here about a model describing an ideal behaviour of the structure; by ideal, we consider a resonator isolated from any other physical effect which in practice could disturb its behaviour, such as, for example, the presence of noise. From there, we can speak of a priori knowledge of resonators because we generally know how they behave in time, in frequency according to external excitation like that of an RF wave that impacts them. We can, therefore, analytically deduce their time-frequency behaviour by calculating the spectrogram.

It is thus possible to describe them as well, and in an equivalent manner, from a transfer function, a differential equation or even an equivalent electrical circuit comprising a resistance, a capacitance, and an inductance. Thus, in a preferably illustrative manner, we establish a reference time-frequency spectrogram from the modulus of a transfer function H, preferably responding to the following equation:

$$H(\omega) = \frac{\frac{2\sigma j\omega}{\omega_r^2}}{1 + \frac{2\sigma j\omega}{\omega_r^2} + \left(\frac{j\omega}{\omega_r}\right)^2} \quad (1)$$

where $\omega$ and $\sigma$ corresponding to the resonance pulsation and the damping factor, respectively, of a second-order centre, $\omega$ is the pulsation, j pure imaginary value, and the pulsation being directly related to the frequency by the expression $\omega=2\cdot\pi\cdot f$. We also note that in addition to being able to model their ideal behaviour, we have knowledge of certain information on the parameters involved in the equation (1). For example, insofar as the resonators have been sized by a person skilled in the art, we know in advance the domain in which the resonance frequencies of the tags are located ($\omega=2\cdot\pi\cdot fr$), same thing for the domain in which the values of the damping factors are located. This knowledge allows us with (1) to define a reference spectrogram which allows us to identify, based on the spectrogram calculated from the measurement, the similarities in terms of shapes which in the end allows us to go back precisely to the information entered in the tags.

It is also noted that any function approaching (1) may also be used in this invention as long as they model the resonators' behaviour to make the tag.

This application describes various technical characteristics and advantages with reference to the Figures and/or various embodiments. Those skilled in the art understand that the technical characteristics of a given embodiment may, in fact, be combined with characteristics of another embodiment unless the reverse is explicitly mentioned or it is obvious that these characteristics are incompatible or that the combination does not provide a solution to at least one of the technical problems mentioned in this application. In addition, the technical characteristics described in a given embodiment may be isolated from the other characteristics of this mode unless the opposite is explicitly mentioned.

It should be obvious to those skilled in the art that this invention allows embodiments in many other specific forms without departing from the scope of the invention as claimed. Consequently, these embodiments must be considered to be for illustrative purposes being able to be modified within the domain defined by the scope of the attached claims, and the invention should not be limited to the details given above.

What is claimed is:

1. A method for detecting a chipless radio frequency identification (RFID) tag the method comprising:
    communication between a reader and the RFID tag on an ultra-wide frequency band (UWB) with a bandwidth greater than or equal to 500 MHz;
    communication comprising the transmission of a signal from the reader to the RFID tag and the backscattering of a signal from the RFID tag; and
    identification of the RFID tag by extraction of the measured backscattered signal using a time-frequency transformation comprising the establishment of a measured time-frequency spectrogram, said identification comprising the recognition of 2D shapes present on the measured time-frequency spectrogram, said shapes being the expression of the resonances of the resonators of the RFID tag.

2. The method for detecting the chipless RFID tag of claim 1, wherein recognizing 2D shapes present on the time-frequency spectrogram comprises establishing a calculated time-frequency spectrogram from an analytical model representative of the resonances of the resonators of the RFID tag and a 2D correlation step by comparison of the measured time-frequency spectrogram and the calculated time-frequency spectrogram.

3. The method for detecting the chipless RFID tag method according to claim 2 wherein the comparison of the measured time-frequency spectrogram and the calculated time-frequency spectrogram comprises topological analysis or conventional regressive mathematical analysis.

4. The method for detecting the chipless RFID method according to claim 1 wherein identifying the RFID tag does not include an averaging step for the time-frequency spectrogram.

5. The method for detecting the chipless RFID tag method according to claim 1 wherein the bandwidth is between 3.1 and 10.6 GHz.

6. The method for detecting the chipless RFID tag method according to claim 1 wherein the reader comprises an electromagnetic wave transceiver reader.

7. The method for detecting the chipless RFID tag method according to claim 6 wherein the reader is a pulse radar.

8. The method for detecting the chipless RFID tag method according to claim 1 wherein the time-frequency transform is a short-time Fourier transform (STFT), the time-frequency spectrogram is an STFT spectrogram, and the identification does not include an averaging step for the STFT spectrogram.

9. The method for detecting the chipless RFID tag method according to claim 1 wherein the identification of the RFID tag by recognizing the 2D shapes present on the time-frequency spectrogram includes recognition of resonance frequency(ies) of the RFID tag.

10. The method for detecting the chipless RFID tag method according to claim 1 wherein identifying the RFID tag by recognizing the 2D shapes present on the time-frequency spectrogram includes recognition of quality factor(s) of the RFID tag.

11. The method for detecting the chipless RFID tag method according to claim 1 wherein identifying the RFID tag by recognizing the 2D shapes present on the time-frequency spectrogram includes recognition of quality factor(s) of the RFID tag, wherein the identification of the RFID tag by recognizing the 2D shapes present on the time-frequency spectrogram includes recognition of resonance frequency(ies) of the RFID tag, and wherein a quality factor is associated with each resonant frequency.

12. A method for detecting a chipless radio frequency identification (RFID) tag the method comprising:
    communication between a reader and the RFID tag on an ultra-wide UWB frequency band with a bandwidth greater than or equal to 500 MHz;

communication comprising the transmission of a signal from the reader to the RFID tag and the backscattering of a signal from the RFID tag; and identification of the RFID tag by extraction of the measured backscattered signal using a time-frequency transformation comprising the establishment of a measured time-frequency spectrogram, said identification comprising the recognition of 2D shapes present on the time-frequency spectrogram, said shapes being the expression of the resonances of the resonators of the RFID tag, wherein the discrimination of two successive RFID tags by means of resonant frequency of the RFID tag and/or quality factor values of the RFID tag is allowed.

13. The method for detecting the chipless RFID tag detection method according to claim 12 it wherein the method allows the discrimination of two successive RFID tags by means of a pair of resonant frequency and quality factor values of the two successive RFID tags.

14. The method for detecting the chipless RFID tag detection method according to claim 12 wherein the RFID tag is a conductive pattern or a set of conductive patterns comprising geometry with at least one asymmetric pattern.

15. The method for detecting the chipless RFID tag according to claim 12 wherein the RFID tag is a set of conductive patterns and wherein all RFID tag patterns are asymmetric.

16. The method for detecting the chipless RFID tag according to claim 12 wherein the RFID tag does not have a ground plane.

17. The method for detecting the chipless RFID tag according to claim 12 wherein the RFID tag is depolarizing.

* * * * *